United States Patent
Kipman et al.

(10) Patent No.: US 7,974,443 B2
(45) Date of Patent: Jul. 5, 2011

(54) VISUAL TARGET TRACKING USING MODEL FITTING AND EXEMPLAR

(75) Inventors: Alex Kipman, Redmond, WA (US);
Mark Finocchio, Redmond, WA (US);
Ryan M. Geiss, San Jose, CA (US);
Johnny Chung Lee, Bellevue, WA (US);
Charles Claudius Marais, Duvall, WA (US); Zsolt Mathe, Issaquah, WA (US)

(73) Assignee: Microsoft Corporation, Armonk, NY (US)

( * ) Notice: Subject to any disclaimer, the term of this patent is extended or adjusted under 35 U.S.C. 154(b) by 0 days.

(21) Appl. No.: 12/953,069

(22) Filed: Nov. 23, 2010

(65) Prior Publication Data

US 2011/0058709 A1 Mar. 10, 2011

Related U.S. Application Data

(63) Continuation of application No. 12/367,435, filed on Feb. 6, 2009, now abandoned.

(60) Provisional application No. 61/148,892, filed on Jan. 30, 2009.

(51) Int. Cl.
*G06K 9/00* (2006.01)
(52) U.S. Cl. .......................................... 382/103; 463/36
(58) Field of Classification Search .................. 382/103, 382/107, 190–208; 463/36–39; 345/419–427
See application file for complete search history.

(56) References Cited

U.S. PATENT DOCUMENTS

| | | | | |
|---|---|---|---|---|
| 6,151,009 A | * | 11/2000 | Kanade et al. | 345/641 |
| 6,788,809 B1 | * | 9/2004 | Grzeszczuk et al. | 382/154 |
| 6,940,538 B2 | * | 9/2005 | Rafey et al. | 348/157 |
| 7,308,112 B2 | | 12/2007 | Fujimura et al. | |
| 2003/0043270 A1 | * | 3/2003 | Rafey et al. | 348/157 |
| 2008/0152191 A1 | | 6/2008 | Fujimura et al. | |
| 2009/0141933 A1 | | 6/2009 | Wagg | |
| 2010/0103169 A1 | * | 4/2010 | Zhang et al. | 345/420 |
| 2010/0183192 A1 | * | 7/2010 | Fritsch et al. | 382/103 |
| 2010/0238160 A1 | * | 9/2010 | Yea et al. | 345/419 |

* cited by examiner

*Primary Examiner* — Bhavesh M Mehta
*Assistant Examiner* — Sean Motsinger
(74) *Attorney, Agent, or Firm* — Alleman Hall McCoy Russell & Tuttle LLP

(57) ABSTRACT

A method of tracking a target includes receiving an observed depth image of the target from a source and analyzing the observed depth image with a prior-trained collection of known poses to find an exemplar pose that represents an observed pose of the target. The method further includes rasterizing a model of the target into a synthesized depth image having a rasterized pose and adjusting the rasterized pose of the model into a model-fitting pose based, at least in part, on differences between the observed depth image and the synthesized depth image. Either the exemplar pose or the model-fitting pose is then selected to represent the target.

20 Claims, 13 Drawing Sheets

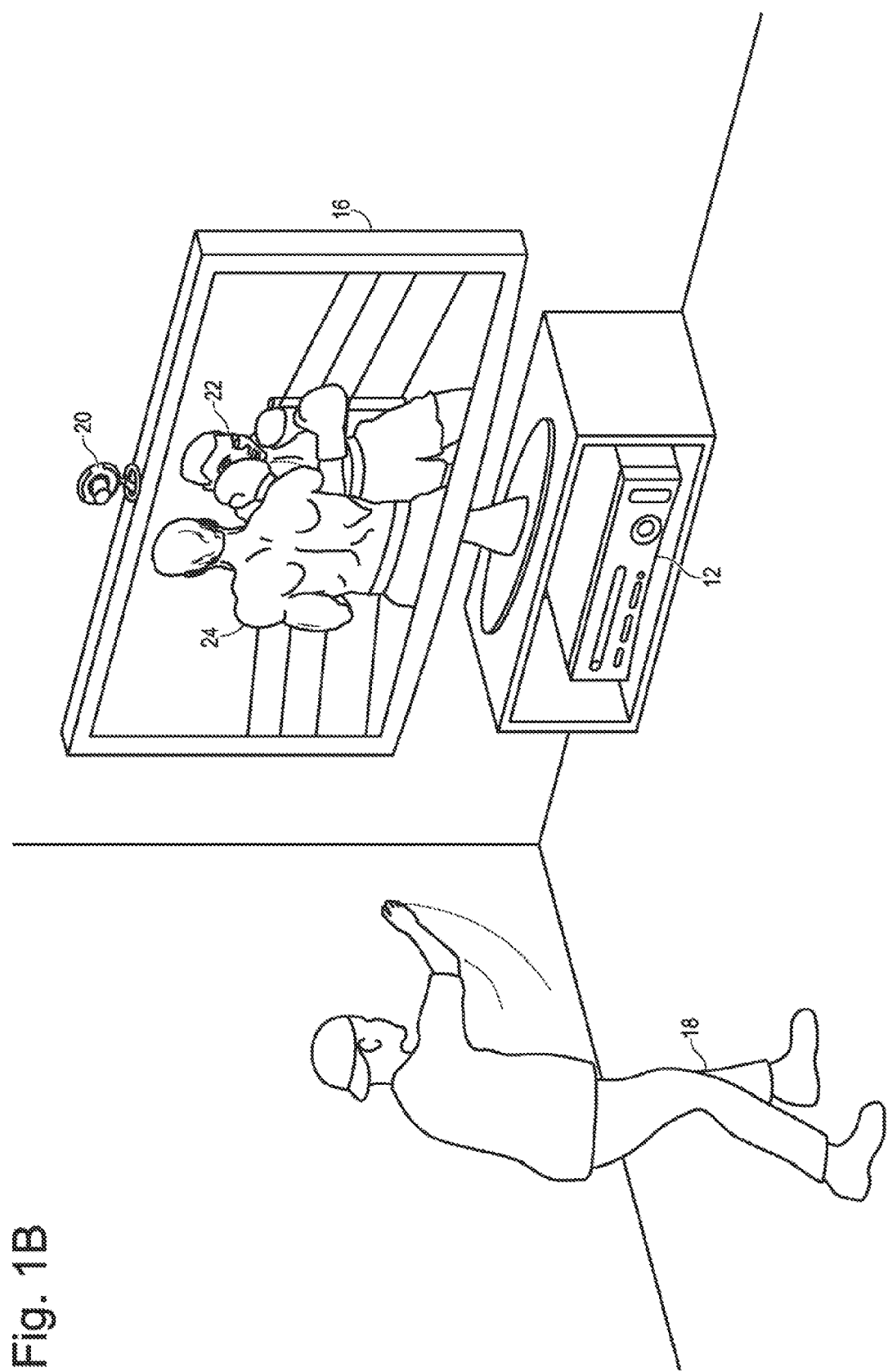

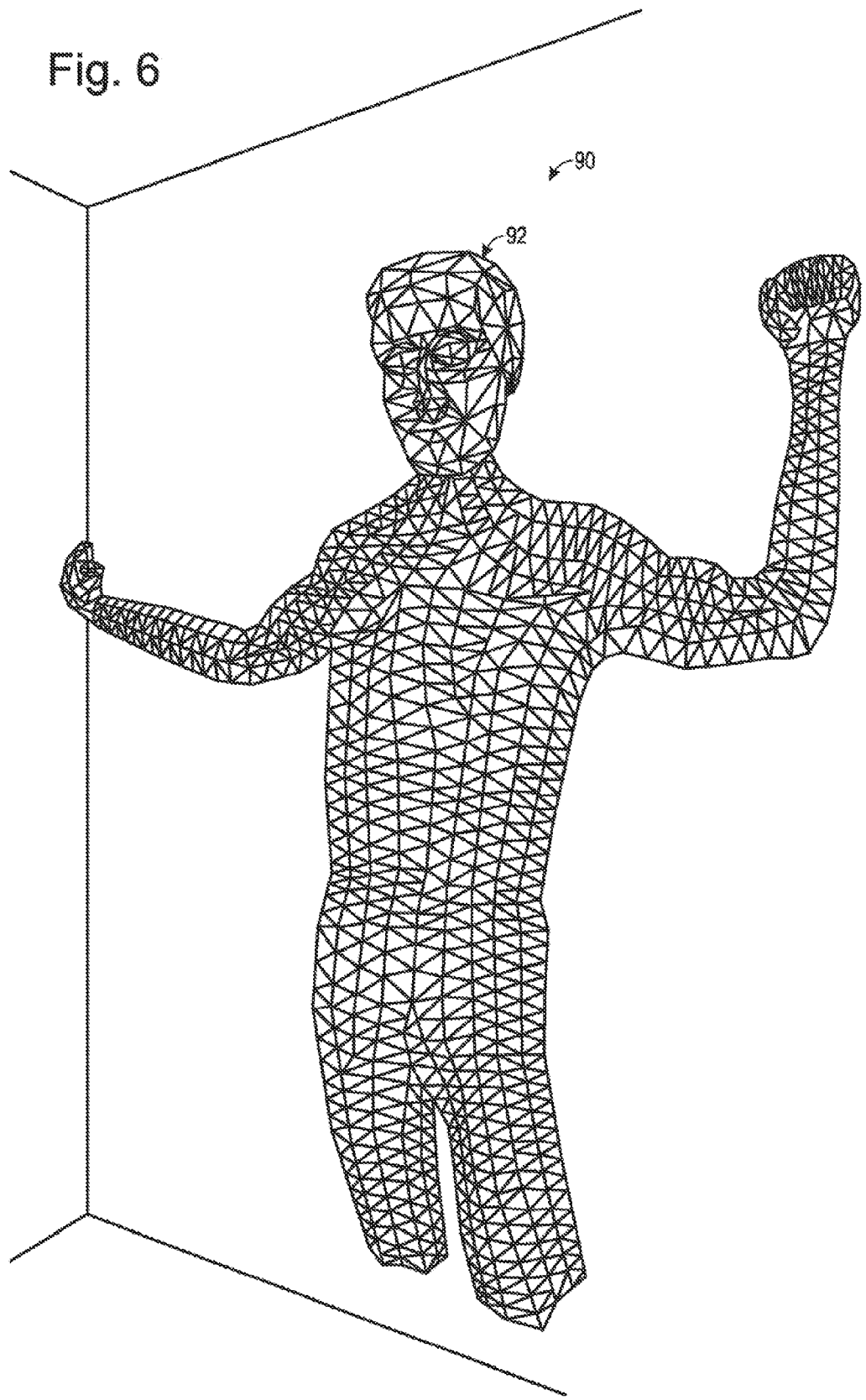

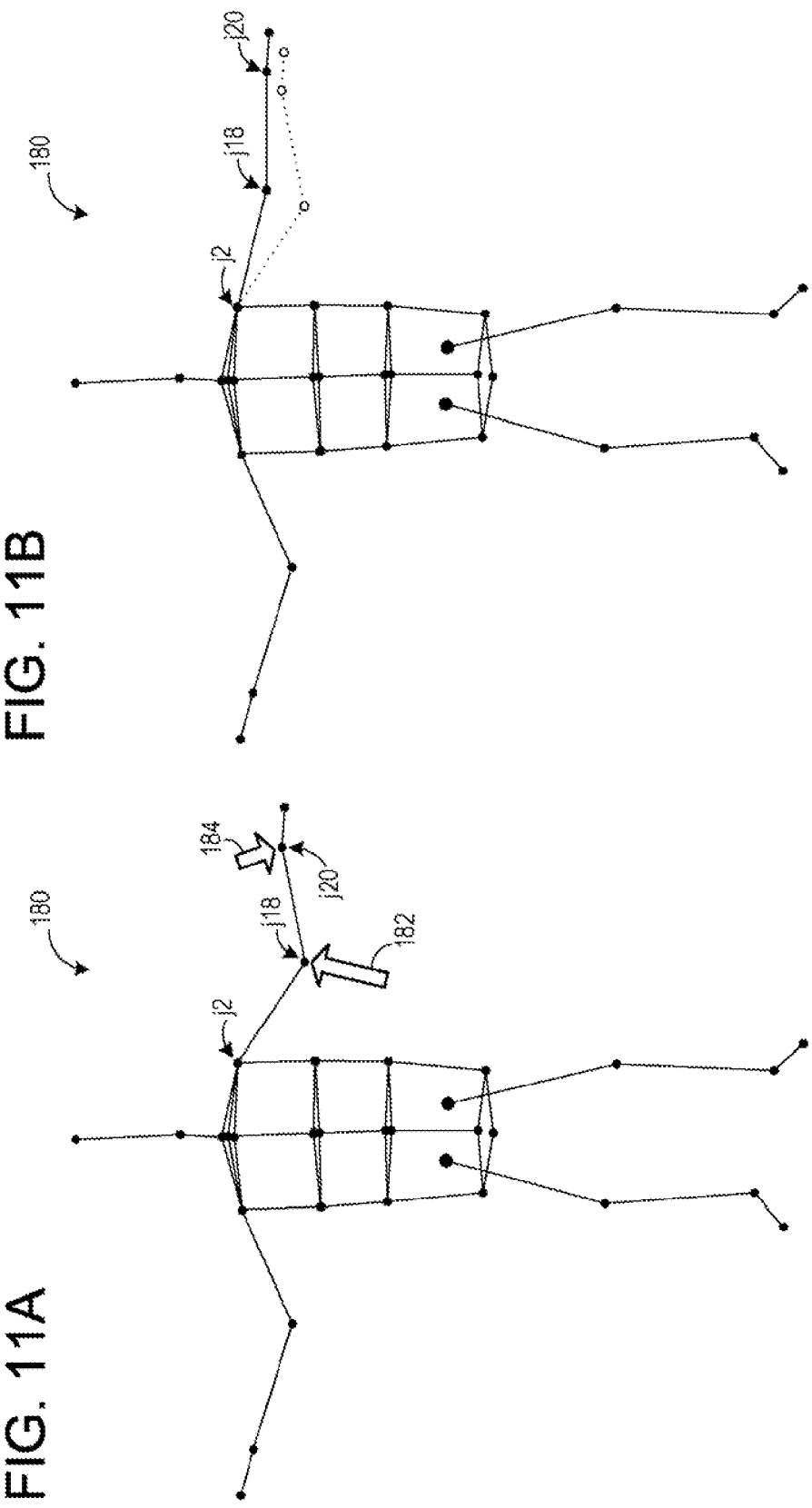

FIG. 15

| Joint | Receives Forces? | Pixel Cases | | | | | | |
|---|---|---|---|---|---|---|---|---|
| | | 1 | 2 | 3 | 4 | 5 | 6 | 7 |
| j1 | Yes | X | X | X | X | X | | X |
| j2 | Yes | X | X | X | X | X | | X |
| j3 | Yes | X | X | X | X | X | | X |
| j4 | Yes | X | X | X | X | X | | X |
| j5 | Yes | X | X | X | X | X | | X |
| j6 | Yes | X | X | X | X | X | | X |
| j7 | Yes | X | X | X | X | X | | X |
| j8 | Yes | X | X | X | X | X | | X |
| j9 | Yes | X | X | X | X | X | | X |
| j10 | Yes | X | X | X | X | X | | X |
| j11 | Yes | X | X | X | X | X | | X |
| j12 | Yes | X | X | X | X | X | | X |
| j13 | Yes | X | X | X | X | X | | X |
| j14 | Yes | X | X | X | X | X | | X |
| j15 | Yes | X | X | X | X | X | | X |
| j16 | Yes | X | X | X | X | X | | X |
| j17 | Yes | | | | | | X | X |
| j18 | Yes | | | | | | X | X |
| j19 | Yes | | | | | | X | X |
| j20 | Yes | | | | | | X | X |
| j21 | Yes | | | | | | X | X |
| j22 | Yes | | | | | | X | X |
| j23 | Yes | X | X | X | X | X | | X |
| j24 | Yes | X | X | X | X | X | | X |
| j25 | Yes | X | X | X | X | X | | X |
| j26 | Yes | X | X | X | X | X | | X |
| j27 | Yes | X | X | X | X | X | | X |
| j28 | Yes | X | X | X | X | X | | X |
| j29 | No | - | - | - | - | - | - | - |
| j30 | No | - | - | - | - | - | - | - |
| j31 | No | - | - | - | - | - | - | - |
| j32 | Yes | X | X | X | X | X | | X |
| j33 | Yes | X | X | X | X | X | | X |
| j34 – j47 | No | - | - | - | - | - | - | - |

VISUAL TARGET TRACKING USING MODEL FITTING AND EXEMPLAR

CROSS-REFERENCE TO RELATED APPLICATIONS

This application is a continuation of U.S. patent application Ser. No. 12/367,435, filed Feb. 6, 2009, which claims priority to Provisional Patent Application No. 61/148,892, filed Jan. 30, 2009, the entire contents of which are hereby incorporated herein by reference for all purposes.

BACKGROUND

Many computer games and other computer vision applications utilize complicated controls to allow users to manipulate game characters or other aspects of an application. Such controls can be difficult to learn, thus creating a barrier to entry for many games or other applications. Furthermore, such controls may be very different from the actual game actions or other application actions for which they are used. For example, a game control that causes a game character to swing a baseball bat may not at all resemble the actual motion of swinging a baseball bat.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments related to visual target tracking are discussed herein. One disclosed approach includes tracking a target by receiving an observed depth image of the target from a source and obtaining a posed model of the target. The posed model is rasterized into a synthesized depth image. The pose of the model is then adjusted based, at least in part, on differences between the observed depth image and the synthesized depth image. This approach may be referred to as model fitting.

Another disclosed embodiment includes receiving an observed depth image of the target from a source and analyzing the observed depth image to determine the likely joint locations of the target as well as the relative confidence that such joint locations are accurate. This approach may be referred to as exemplar (i.e., it finds a pose by example). The exemplar method focuses on matching poses of a target (e.g., human) against a prior-trained collection of known poses.

Model fitting and/or exemplar may be facilitated by body scanning and/or background removal. Body scanning includes receiving one or more frames of observed depth images from a source. The scene of each observed depth image may be scanned to find one or more human targets in a pose from which the basic size and shape of the human target(s) can be confidently deduced. This approach may be referred to as body scanning.

Background removal includes using one of several possible different methodologies for identifying those portions of a scene that does not include a human target, so that those portions of the scene may be ignored, thereby reducing computational expense. One background removal approach defines a sphere, or other geometric shape, using extremities (e.g., head, feet, hands, etc.) of the target to set the size and position of the sphere. Observed depth values within the sphere and/or a buffer, are considered in subsequent processing steps, while observed depth values outside of the sphere may be at least temporarily ignored as being part of the background and not part of the target.

Model fitting, exemplar, body scanning, and/or background removal may be used in a cooperative analysis pipeline. In such approaches, body scanning may be used to deduce a general size and shape of a target and to select a model that has such a size and shape. Either exemplar or body fitting may then be used to find a pose of the model that accurately represents the pose of the target. A relative confidence of a pose found by exemplar may be judged to determine whether a pose found by exemplar or a pose computed by model fitting should be used. Background removal can be utilized in conjunction with exemplar and/or model fitting to accurately classify a target and body parts of the target. Background removal also can be utilized as an optimization during this process.

BRIEF DESCRIPTION OF THE DRAWINGS

FIG. 1B shows the game player of FIG. 1A throwing a punch that is tracked and interpreted as a game control that causes a player avatar to throw a punch in game space.

FIG. 6 shows an exemplary mesh model used to represent a human target.

FIG. 11A schematically shows the application of a force to a force-receiving location of a model.

FIG. 11B schematically shows a result of applying the force to the force-receiving location of the model of FIG. 11A.

FIG. 15 shows a table detailing example relationships between various pixel cases and skeletal model joints.

DETAILED DESCRIPTION

The present disclosure is directed to target recognition, analysis, and tracking. In particular, the use of a depth camera or other source for acquiring depth information for one or more targets is disclosed. Such depth information may then be used to efficiently and accurately model and track the one or more targets, as described in detail below. The target recognition, analysis, and tracking described herein provides a robust platform in which one or more targets can be consistently tracked at a relatively fast frame rate, even when the target(s) move into poses that have been considered difficult to analyze using other approaches (e.g., when two or more targets partially overlap and/or occlude one another; when a portion of a target self-occludes another portion of the same target, when a target changes its topographical appearance (e.g., a human touching his or her head), etc.).

Figure 1A:
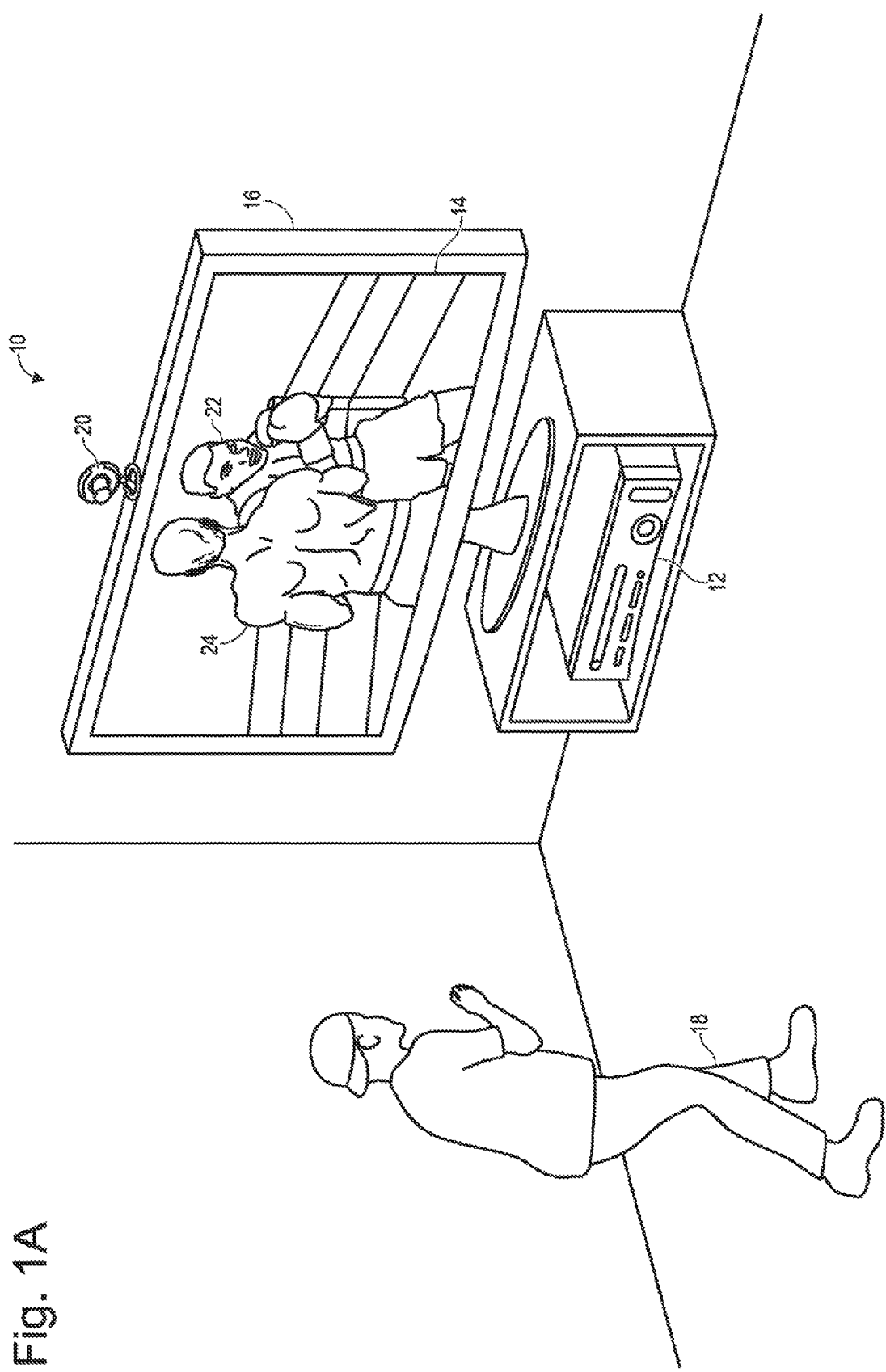
FIG. 1A shows an embodiment of an exemplary target recognition, analysis, and tracking system tracking a game player playing a boxing game.

FIG. 1A shows a nonlimiting example of a target recognition, analysis, and tracking system 10. In particular, FIG. 1A shows a computer gaming system 12 that may be used to play a variety of different games, play one or more different media types, and/or control or manipulate non-game applications. FIG. 1A also shows a display 14 in the form of a high-definition television, or HDTV 16, which may be used to present game visuals to game players, such as game player 18. Furthermore, FIG. 1A shows a capture device in the form of a depth camera 20, which may be used to visually monitor one or more game players, such as game player 18. The example shown in FIG. 1A is nonlimiting. As described below with reference to FIG. 2, a variety of different types of target recognition, analysis, and tracking systems may be used without departing from the scope of this disclosure.

A target recognition, analysis, and tracking system may be used to recognize, analyze, and/or track one or more targets, such as game player 18. FIG. 1A shows a scenario in which game player 18 is tracked using depth camera 20 so that the movements of game player 18 may be interpreted by gaming system 12 as controls that can be used to affect the game being executed by gaming system 12. In other words, game player 18 may use his movements to control the game. The movements of game player 18 may be interpreted as virtually any type of game control.

The example scenario illustrated in FIG. 1A shows game player 18 playing a boxing game that is being executed by gaming system 12. The gaming system uses HDTV 16 to visually present a boxing opponent 22 to game player 18. Furthermore, the gaming system uses HDTV 16 to visually present a player avatar 24 that gaming player 18 controls with his movements. As shown in FIG. 1B, game player 18 can throw a punch in physical space as an instruction for player avatar 24 to throw a punch in game space. Gaming system 12 and depth camera 20 can be used to recognize and analyze the punch of game player 18 in physical space so that the punch can be interpreted as a game control that causes player avatar 24 to throw a punch in game space. For example, FIG. 1B shows HDTV 16 visually presenting player avatar 24 throwing a punch that strikes boxing opponent 22 responsive to game player 18 throwing a punch in physical space.

Other movements by game player 18 may be interpreted as other controls, such as controls to bob, weave, shuffle, block, jab, or throw a variety of different power punches. Furthermore, some movements may be interpreted into controls that serve purposes other than controlling player avatar 24. For example, the player may use movements to end, pause, or save a game, select a level, view high scores, communicate with a friend, etc.

In some embodiments, a target may include a human and an object. In such embodiments, for example, a player of an electronic game may be holding an object, such that the motions of the player and the object are utilized to adjust and/or control parameters of the electronic game. For example, the motion of a player holding a racket may be tracked and utilized for controlling an on-screen racket in an electronic sports game. In another example, the motion of a player holding an object may be tracked and utilized for controlling an on-screen weapon in an electronic combat game.

Target recognition, analysis, and tracking systems may be used to interpret target movements as operating system and/or application controls that are outside the realm of gaming. Virtually any controllable aspect of an operating system and/or application, such as the boxing game shown in FIGS. 1A and 1B, may be controlled by movements of a target, such as game player 18. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Figure 2:
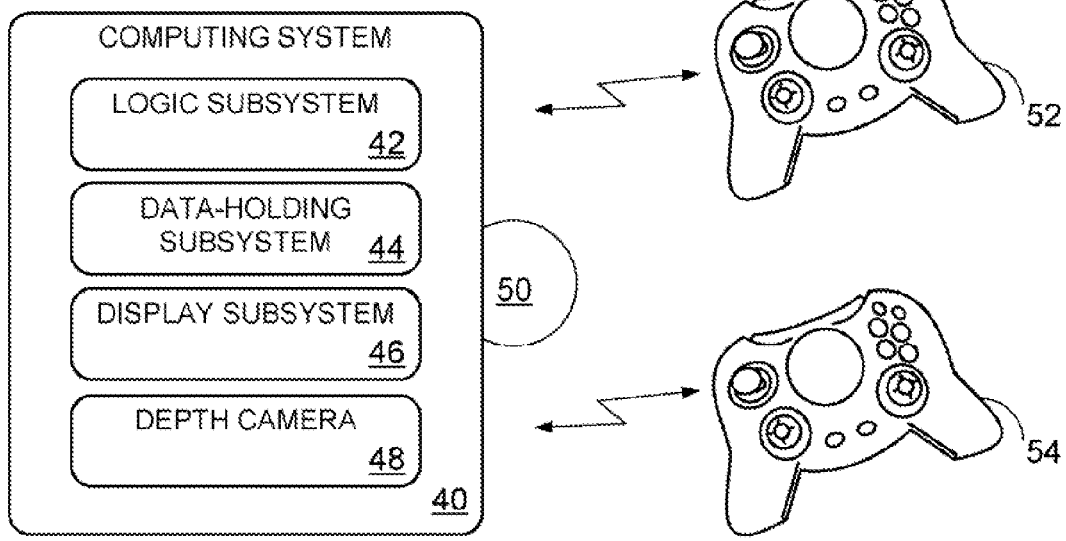
FIG. 2 schematically shows a computing system in accordance with an embodiment of the present disclosure.

The methods and processes described herein may be tied to a variety of different types of computing systems. FIGS. 1A and 1B show a nonlimiting example in the form of gaming system 12, HDTV 16, and depth camera 20. As another, more general, example, FIG. 2 schematically shows a computing system 40 that may perform one or more of the target recognition, tracking, and analysis methods and processes described herein. Computing system 40 may take a variety of different forms, including, but not limited to, gaming consoles, personal computing gaming systems, military tracking and/or targeting systems, and character acquisition systems offering green-screen or motion-capture functionality, among others.

Computing system 40 may include a logic subsystem 42, a data-holding subsystem 44, a display subsystem 46, and/or a capture device 48. The computing system may optionally include components not shown in FIG. 2, and/or some components shown in FIG. 2 may be peripheral components that are not integrated into the computing system.

Logic subsystem 42 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 44 may include one or more physical devices configured to hold data and/or instructions executable by the logic subsystem to implement the herein described methods and processes. When such methods and processes are implemented, the state of data-holding subsystem 44 may be transformed (e.g., to hold different data). Data-holding subsystem 44 may include removable media and/or built-in devices. Data-holding subsystem 44 may include optical memory devices, semiconductor memory devices (e.g., RAM, EEPROM, flash, etc.), and/or magnetic memory devices, among others. Data-holding subsystem 44 may include devices with one or more of the following characteristics: volatile, nonvolatile, dynamic, static, read/write, read-only, random access, sequential access, location addressable, file addressable, and content addressable. In some embodiments, logic subsystem 42 and data-holding subsystem 44 may be integrated into one or more common devices, such as an application specific integrated circuit or a system on a chip.

FIG. 2 also shows an aspect of the data-holding subsystem in the form of computer-readable removable media 50, which may be used to store and/or transfer data and/or instructions executable to implement the herein described methods and processes.

Display subsystem 46 may be used to present a visual representation of data held by data-holding subsystem 44. As the herein described methods and processes change the data held by the data-holding subsystem, and thus transform the state of the data-holding subsystem, the state of display subsystem 46 may likewise be transformed to visually represent changes in the underlying data. As a nonlimiting example, the target recognition, tracking, and analysis described herein may be reflected via display subsystem 46 in the form of a game character that changes poses in game space responsive to the movements of a game player in physical space. Display subsystem 46 may include one or more display devices utilizing virtually any type of technology. Such display devices may be combined with logic subsystem 42 and/or data-holding subsystem 44 in a shared enclosure, or such display devices may be peripheral display devices, as shown in FIGS. 1A and 1B.

Computing system 40 further includes a capture device 48 configured to obtain depth images of one or more targets. Capture device 48 may be configured to capture video with depth information via any suitable technique (e.g., time-of-flight, structured light, stereo image, etc.). As such, capture device 48 may include a depth camera, a video camera, stereo cameras, and/or other suitable capture devices.

For example, in time-of-flight analysis, the capture device 48 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 48 to capture depth information. In such an analysis, patterned light (i.e., light displayed as a known pattern such as grid pattern or a stripe pattern) may be projected onto the target. Upon striking the surface of the target, the pattern may become deformed in response, and this deformation of the pattern may be studied to determine a physical distance from the capture device to a particular location on the target.

In another example, the capture device may include two or more physically separated cameras that view a target from different angles, to obtain visual stereo data. In such cases, the visual stereo data may be resolved to generate a depth image.

In other embodiments, capture device 48 may utilize other technologies to measure and/or calculate depth values. Additionally, capture device 48 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 40 may optionally include one or more input devices, such as controller 52 and controller 54. Input devices may be used to control operation of the computing system. In the context of a game, input devices, such as controller 52 and/or controller 54 can be used to control aspects of a game not controlled via the target recognition, tracking, and analysis methods and procedures described herein. In some embodiments, input devices such as controller 52 and/or controller 54 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

Computing system 40 may be configured to perform the target tracking methods described herein. However, it should be understood that computing system 40 is provided as a nonlimiting example of a device that may perform such target tracking. Other devices are within the scope of this disclosure.

Computing system 40, or another suitable device, may be configured to represent each target with a model. As described in more detail below, information derived from such a model can be compared to information obtained from a capture device, such as a depth camera, so that the fundamental proportions or shape of the model, as well as its current pose, can be adjusted to more accurately represent the modeled target. The model may be represented by one or more polygonal meshes, by a set of mathematical primitives, and/or via other suitable machine representations of the modeled target.

Figure 3:
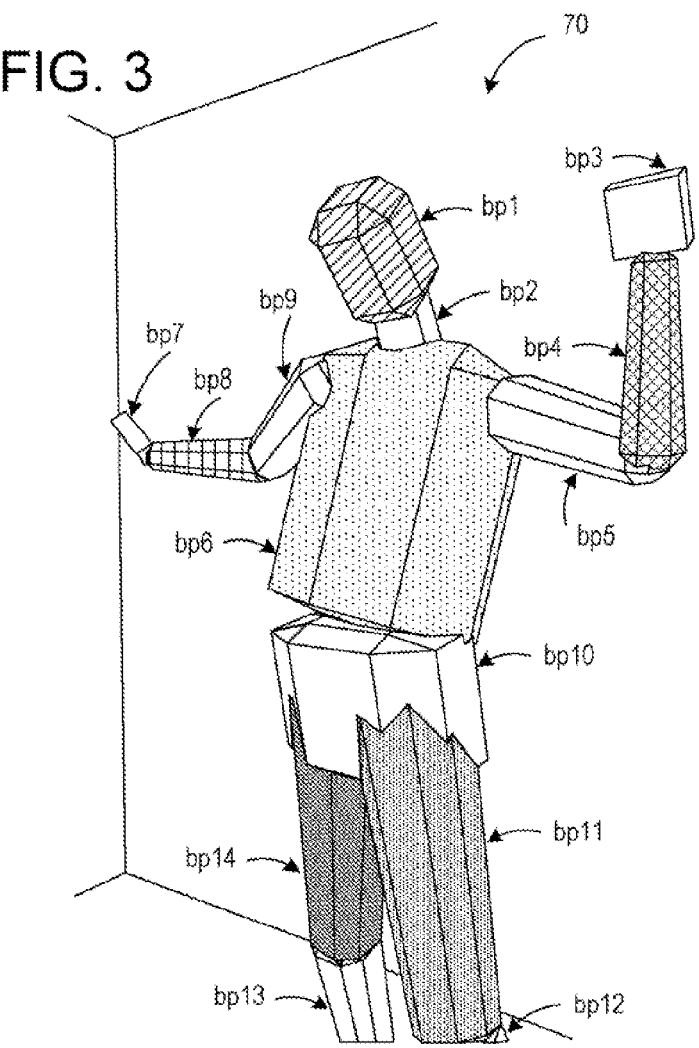
FIG. 3 shows an exemplary body model used to represent a human target.

FIG. 3 shows a nonlimiting visual representation of an example body model 70. Body model 70 is a machine representation of a modeled target (e.g., game player 18 from FIGS. 1A and 1B). The body model may include one or more data structures that include a set of variables that collectively define the modeled target in the language of a game or other application/operating system.

A model of a target can be variously configured without departing from the scope of this disclosure. In some examples, a model may include one or more data structures that represent a target as a three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 3 includes body parts bp1 through bp14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may comprise one or more structural members (i.e., "bones"), with joints located at the intersection of adjacent bones. It is to be understood that some bones may correspond to anatomical bones in a human target and/or some bones may not have corresponding anatomical bones in the human target.

Figure 5:
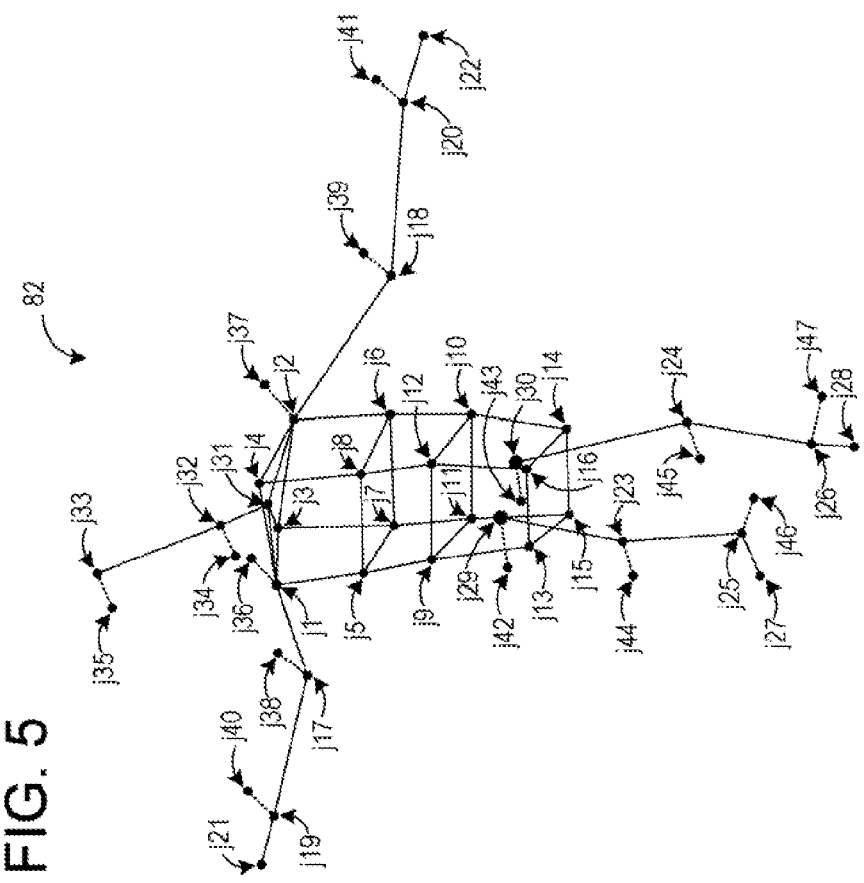
FIG. 5 shows a skewed view of an exemplary skeletal model used to represent a human target.
Figure 4:
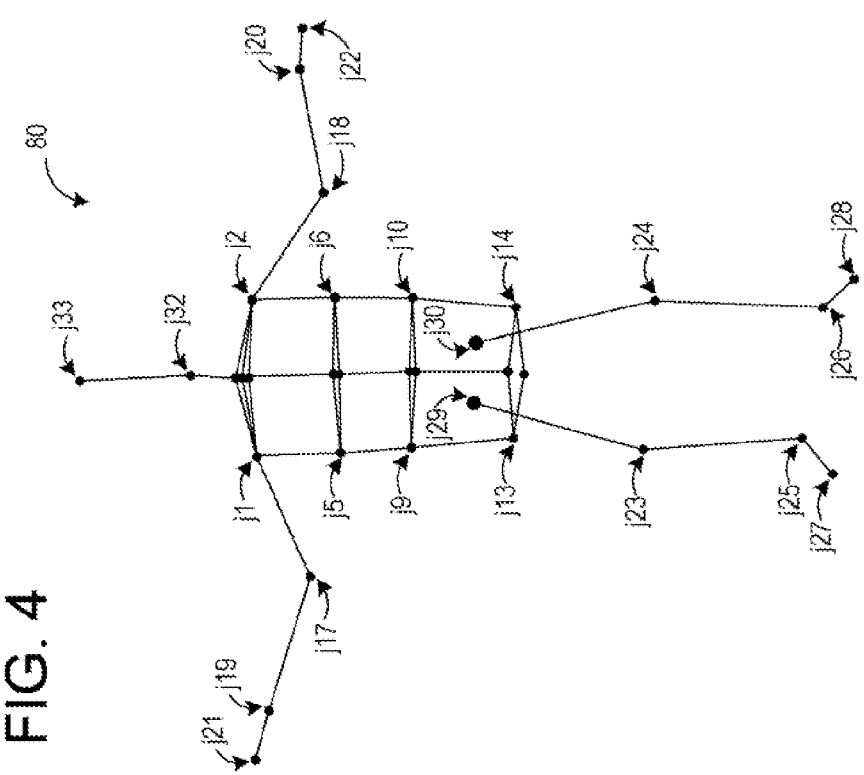
FIG. 4 shows a substantially frontal view of an exemplary skeletal model used to represent a human target.

The bones and joints may collectively make up a skeletal model, which may be a constituent element of the model. The skeletal model may include one or more skeletal members for each body part and a joint between adjacent skeletal members. Exemplary skeletal model 80 and exemplary skeletal model 82 are shown in FIGS. 4 and 5, respectively. FIG. 4 shows a skeletal model 80 as viewed from the front, with joints j1 through j33. FIG. 5 shows a skeletal model 82 as viewed from a skewed view, also with joints j1 through j33. Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). Thus, whereas joints can receive forces and adjust the skeletal model, as described below, roll joints may instead be constructed and utilized to track axial roll angles. More generally, by examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

As described above, some models may include a skeleton and/or body parts that serve as a machine representation of a modeled target. In some embodiments, a model may alternatively or additionally include a wireframe mesh, which may include hierarchies of rigid polygonal meshes, one or more deformable meshes, or any combination of the two. As a nonlimiting example, FIG. 6 shows a model 90 including a plurality of triangles (e.g., triangle 92) arranged in a mesh that defines the shape of the body model. Such a mesh may include bending limits at each polygonal edge. When a mesh is used, the number of triangles, and/or other polygons, that collectively constitute the mesh can be selected to achieve a desired balance between quality and computational expense. More triangles may provide higher quality and/or more accurate models, while fewer triangles may be less computationally demanding. A body model including a polygonal mesh need not include a skeleton, although it may in some embodiments.

The above described body part models, skeletal models, and polygonal meshes are nonlimiting example types of models that may be used as machine representations of a modeled target. Other models are also within the scope of this disclosure. For example, some models may include patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that any model that can be posed and then rasterized to (or otherwise rendered to or expressed by) a synthesized depth image, is compatible with the herein described target recognition, analysis, and tracking.

As mentioned above, a model serves as a representation of a target, such as game player 18 in FIGS. 1A and 1B. As the target moves in physical space, information from a capture device, such as depth camera 20 in FIGS. 1A and 1B, can be used to adjust a pose and/or the fundamental size/shape of the model so that it more accurately represents the target. As an example, a model fitting approach may apply one or more forces to one or more force-receiving aspects of the model to adjust the model into a pose that more closely corresponds to the pose of the target in physical space. Depending on the type of model that is being used, the force may be applied to a joint, a centroid of a body part, a vertex of a triangle, or any other suitable force-receiving aspect of the model. Furthermore, in some embodiments, two or more different calculations may be used when determining the direction and/or magnitude of the force. As described in more detail below, differences between an observed image of the target, as retrieved by a capture device, and a rasterized (i.e., synthesized) image of the model may be used to determine the forces that are applied to the model in order to adjust the body into a different pose.

Figure 7:
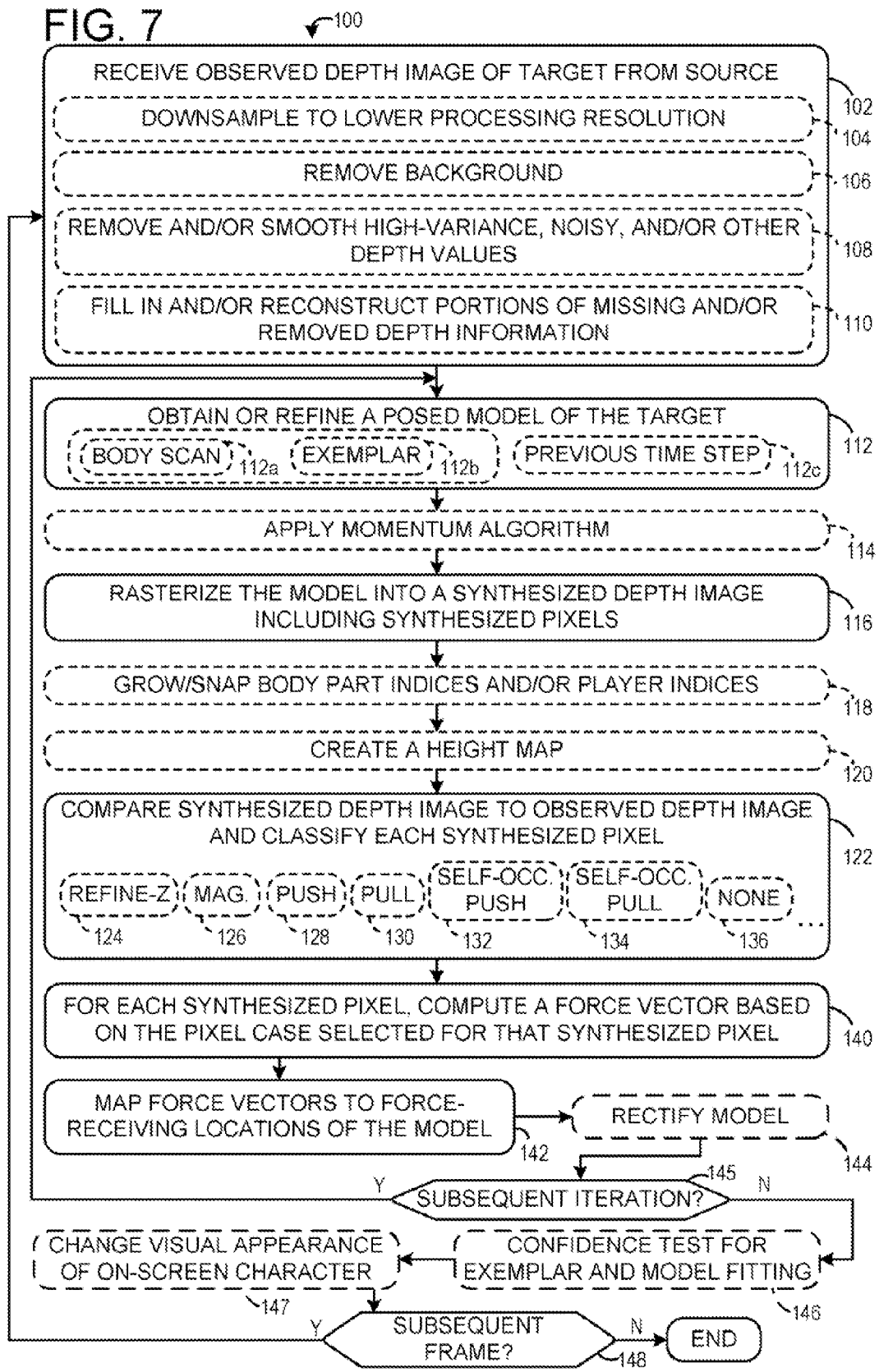
FIG. 7 shows a flow diagram of an example method of visually tracking a target.

FIG. 7 shows a flow diagram of an example method 100 of tracking a target using a model (e.g., body model 70 of FIG. 3) and a model fitting approach. In some embodiments, the target may be a human, and the human may be one of two or more targets being tracked. As such, in some embodiments, method 100 may be executed by a computing system (e.g., gaming system 12 shown in FIG. 1 and/or computing system 40 shown in FIG. 2) to track one or more players interacting with an electronic game being played on the computing system. As introduced above, tracking of the players allows physical movements of those players to act as a real-time user interface that adjusts and/or controls parameters of the electronic game. For example, the tracked motions of a player may be used to move an on-screen character or avatar in an electronic role-playing game. In another example, the tracked motions of a player may be used to control an on-screen vehicle in an electronic racing game. In yet another example, the tracked motions of a player may be used to control the building or organization of objects in a virtual environment.

Figure 8:
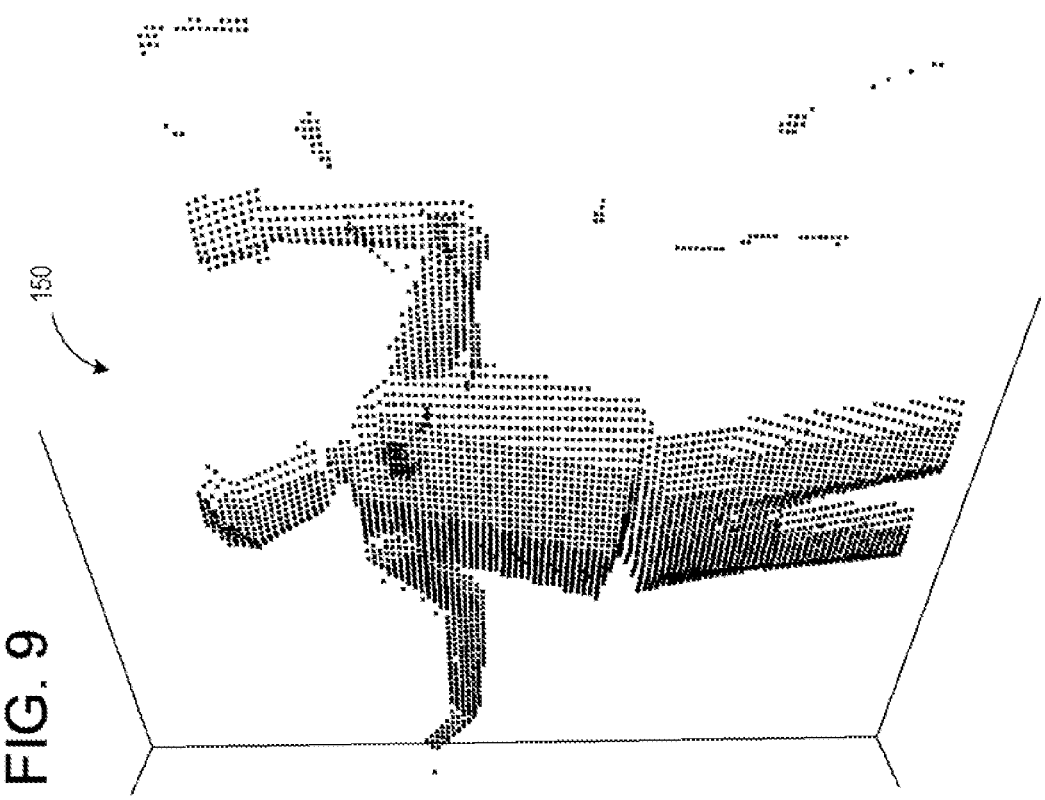
FIG. 8 shows an exemplary observed depth image.

At 102, method 100 includes receiving an observed depth image of the target from a source. In some embodiments, the source may be a depth camera configured to obtain depth information about the target via a suitable technique such as time-of-flight analysis, structured light analysis, stereo vision analysis, or other suitable techniques. The observed depth image may include a plurality of observed pixels, where each observed pixel has an observed depth value. The observed depth value includes depth information of the target as viewed from the source. FIG. 8 shows a visual representation of an exemplary observed depth image 140. As shown, observed depth image 140 captures an exemplary observed pose of a person (e.g., game player 18) standing with his arms raised.

As shown at 104 of FIG. 7, upon receiving the observed depth image, method 100 may optionally include downsampling the observed depth image to a lower processing resolution. Downsampling to a lower processing resolution may allow the observed depth image to be more easily utilized and/or more quickly processed with less computing overhead.

As shown at 106, upon receiving the observed depth image, method 100 may optionally include removing non-player background elements from the observed depth image. Removing such background elements may include separating various regions of the observed depth image into background regions and regions occupied by the image of the target. Background regions can be removed from the image or identified so that they can be ignored during one or more subsequent processing steps. Virtually any background removal technique may be used, and information from tracking (and from the previous frame) can optionally be used to assist and improve the quality of background-removal. As one nonlimiting example, a sphere, other geometric shape, and/or buffer, may be defined around a target using extremities of the target (e.g., head, feet, hands, etc.) to set the size and position of the sphere. Observed depth values within the sphere and/or a buffer, are considered in subsequent processing steps, while observed depth values outside of the sphere may be at least temporarily ignored as being part of the background and not part of the target.

As shown at 108, upon receiving the observed depth image, method 100 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity for future calculations.

Other depth values may also be filtered. For example, the accuracy of growth operations described below with reference to step 118 may be enhanced by selectively removing pixels satisfying one or more removal criteria. For instance, if a depth value is halfway between a hand and the torso that the hand is occluding, removing this pixel can prevent growth operations from spilling from one body part onto another during subsequent processing steps.

As shown at 110, method 100 may optionally include filling in and/or reconstructing portions of missing and/or removed depth information. Such backfilling may be accomplished by averaging nearest neighbors, filtering, and/or any other suitable method.

As shown at 112 of FIG. 7, method 100 may include obtaining and/or refining a posed model of the target (e.g., body model 70 of FIG. 3). As described above, the model may include one or more polygonal meshes, one or more mathematical primitives, one or more high-order surfaces, and/or other features used to provide a machine representation of the target. Furthermore, the model may exist as an instance of one or more data structures existing on a computing system.

As indicated at 112a, one or more body scans can be used to find a suitable model. According to an example embodiment, portions of the depth image may be flood filled and compared to one or more patterns to determine whether the target(s) may be human target(s). As an example, a model may be selected by one or more algorithms that are configured to analyze a depth image and identify, at a coarse level, where the target(s) of interest (e.g., human(s)) are located and/or the size of such target(s). If one or more of the targets in the depth image includes a human target, the human target may be systematically scanned to identify likely body parts and/or joints. A model of the human target may then be generated based on the scan. For example, the relative length of different skeletal members and/or the size/volume of different body parts may be determined. In some embodiments, the model may be obtained from a database and/or other program including one or more models. This type of body scanning may be performed over one or more frames.

As indicated at 112b, exemplar pose determination algorithms can be used to obtain an exemplar pose of the model during an initial iteration or whenever it is believed that the algorithm can select a pose more accurate than the pose calculated/obtained during a previous time step (e.g., via a previous model fitting or exemplar pose determination). The exemplar method focuses on matching poses of a target (e.g., human) against a prior-trained collection of known poses. The exemplar approach can find an exemplar pose without any prior context (i.e., knowledge of the prior frame is not needed).

In some embodiments, the exemplar algorithms may utilize one or more decision trees to analyze each pixel of interest in an observed depth image. Such analysis can find a best-guess of the body part for that pixel and the confidence that the best-guess is correct. At each node of the decision tree, an observed depth value comparison between two pixels is made, and, depending on the result of the comparison, a subsequent depth value comparison between two other pixels is made at the child node of the decision tree. The result of such comparisons at each node determines the pixels that are to be compared at the next node. The terminal nodes of each decision tree result in a body part classification and associated confidence in the classification. The relative joint positions of the model and associated confidences in joint position may be determined in this way.

In some embodiments, subsequent decision trees may be used to iteratively refine the best-guess of the body part for each pixel and the confidence that the best-guess is correct. For example, once the pixels have been classified with the first classifier tree (based on neighboring depth values), a refining classification may be performed to classify each pixel by using a second decision tree that looks at the previous classified pixels and/or depth values. A third pass may also be used to further refine the classification of the current pixel by looking at the previous classified pixels and/or depth values. It is to be understood that virtually any number of iterations may be performed, with fewer iterations resulting in less computational expense and more iterations potentially offering more accurate classifications and/or confidences.

The decision trees may be constructed during a training mode in which a sample of known models in known poses are analyzed to determine the questions (i.e., tests) that can be asked at each node of the decision trees in order to produce accurate pixel classifications.

In some embodiments of method 100, the model may be a posed model obtained from a previous time step, as indicated at 112c. For example, if method 100 is performed continuously, a posed model resulting from a previous iteration of method 100, corresponding to a previous time step, may be obtained.

Even if a model from a previous time step is available, a model obtained from an exemplar algorithm or database may be chosen over a model obtained from the model fitting approach. For example, a model from exemplar may be used after a certain number of frames, if the target has changed poses by more than a predetermined threshold, if the model obtained via exemplar is judged to be more accurate than the model obtained via model fitting, if a confidence in the model obtained via exemplar is above a predetermined threshold, and/or according to other criteria. This is described further with reference to FIGS. 13 and 14.

In some embodiments, additional analysis may be performed in order to establish a relative confidence in a pose. For example, a hand-identifying algorithm may be used to determine the position of a human target's hands. The hand position of a model obtained via exemplar and the hand position of a model obtained via model fitting may be compared to the hand position obtained via the hand-identifying algorithm. This determination can be used to bias the selection of the pose obtained via exemplar or the pose obtained via model fitting. For example, if hand position from the hand-identifying algorithm closely matches hand position from model fitting but not hand position from exemplar, selection may be biased toward the model obtained via model fitting.

In other embodiments, the model, or portions thereof, may be synthesized. For example, if the target's body core (torso, midsection, and hips) are represented by a deformable polygonal model, that model may be originally constructed using the contents of an observed depth image, where the outline of the target in the image (i.e., the silhouette) may be used to shape the mesh in the X and Y dimensions. Additionally, in such an approach, the observed depth value(s) in that area of the observed depth image may be used to "mold" the mesh in the XY direction, as well as in the Z direction, of the model to more favorably represent the target's body shape.

Method 100 may further include representing any clothing appearing on the target using a suitable approach. Such a suitable approach may include adding to the model auxiliary geometry in the form of primitives or polygonal meshes, and optionally adjusting the auxiliary geometry based on poses to reflect gravity, cloth simulation, etc. Such an approach may facilitate molding the models into more realistic representations of the targets.

As shown at 114, method 100 may optionally comprise applying a momentum algorithm to the model. Because the momentum of various parts of a target may predict change in an image sequence, such an algorithm may assist in obtaining the pose of the model. The momentum algorithm may use a trajectory of each of the joints or vertices of a model over a fixed number of a plurality of previous frames to assist in obtaining the model.

In some embodiments, knowledge that different portions of a target can move a limited distance in a time frame (e.g., $\frac{1}{30}^{th}$ or $\frac{1}{60}^{th}$ of a second) can be used as a constraint in obtaining a model. Such a constraint may be used to rule out certain poses when a prior frame is known.

At 116 of FIG. 7, method 100 may also include rasterizing the model into a synthesized depth image having a rasterized pose. Rasterization allows the model described by mathematical primitives, polygonal meshes, or other objects to be converted into a synthesized depth image described by a plurality of pixels.

Rasterizing may be carried out using one or more different techniques and/or algorithms. For example, rasterizing the model may include projecting a representation of the model onto a two-dimensional plane. In the case of a model including a plurality of body-part shapes (e.g., body model 70 of FIG. 3), rasterizing may include projecting and rasterizing the collection of body-part shapes onto a two-dimensional plane. For each pixel in the two dimensional plane onto which the model is projected, various different types of information may be stored.

Figure 9:
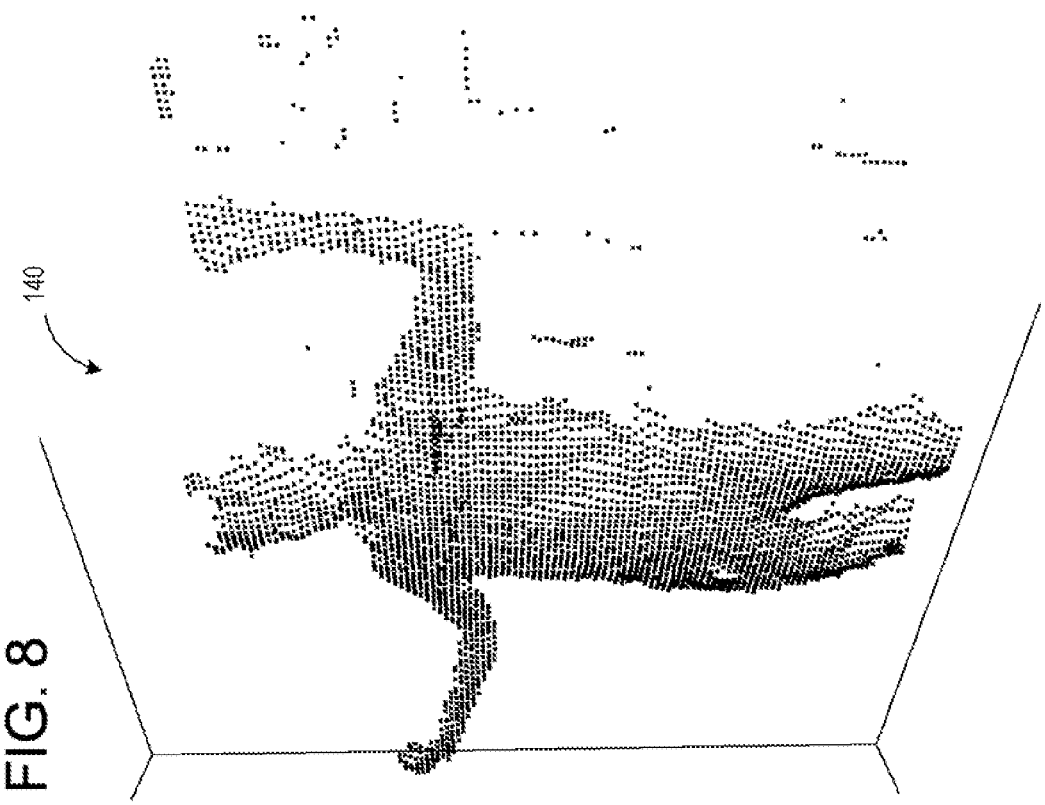
FIG. 9 shows an exemplary synthesized depth image.
Figure 10:
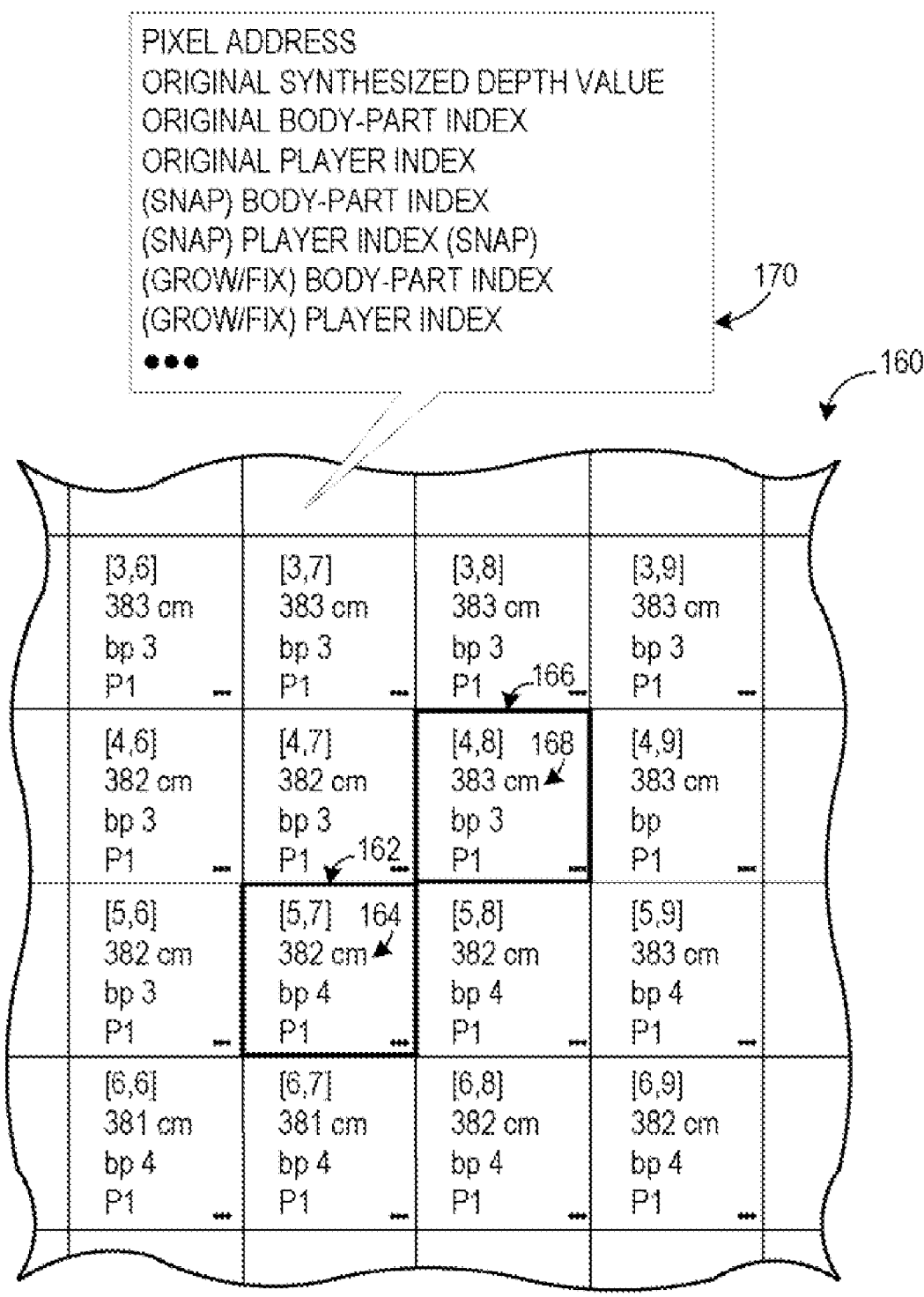
FIG. 10 schematically shows some of the pixels making up a synthesized depth image.

FIG. 9 shows a visual representation 150 of an exemplary synthesized depth image corresponding to body model 70 of FIG. 3. FIG. 10 shows a pixel matrix 160 of a portion of the same synthesized depth image. As indicated at 170, each synthesized pixel in the synthesized depth image may include a synthesized depth value. The synthesized depth value for a given synthesized pixel may be the depth value from the corresponding part of the model that is represented by that synthesized pixel, as determined during rasterization. In other words, if a portion of a forearm body part (e.g., forearm body part bp4 of FIG. 3) is projected onto a two-dimensional plane, a corresponding synthesized pixel (e.g., synthesized pixel 162 of FIG. 10) may be given a synthesized depth value (e.g., synthesized depth value 164 of FIG. 10) equal to the depth value of that portion of the forearm body part. In the illustrated example, synthesized pixel 162 has a synthesized depth value of 382 cm. Likewise, if a neighboring hand body part (e.g., hand body part bp3 of FIG. 3) is projected onto a two-dimensional plane, a corresponding synthesized pixel (e.g., synthesized pixel 166 of FIG. 10) may be given a synthesized depth value (e.g., synthesized depth value 168 of FIG. 10) equal to the depth value of that portion of the hand body part. In the illustrated example, synthesized pixel 166 has a synthesized depth value of 383 cm. It is to be understood that the above is provided as an example. Synthesized depth values may be saved in any unit of measurement or as a dimensionless number.

As indicated at 170, each synthesized pixel in the synthesized depth image may include an original body-part index determined during rasterization. Such an original body-part index may indicate to which of the body parts of the model that pixel corresponds. In the illustrated example of FIG. 10, synthesized pixel 162 has an original body-part index of bp4, and synthesized pixel 166 has an original body-part index of bp3. In some embodiments, the original body-part index of a synthesized pixel may be nil if the synthesized pixel does not correspond to a body part of the target (e.g., if the synthesized pixel is a background pixel). In some embodiments, synthesized pixels that do not correspond to a body part may be given a different type of index.

As indicated at 170, each synthesized pixel in the synthesized depth image may include an original player index determined during rasterization, the original player index corresponding to the target. For example, if there are two targets, synthesized pixels corresponding to the first target will have a first player index and synthesized pixels corresponding to the second target will have a second player index. In the illustrated example, the pixel matrix 160 corresponds to only one target, therefore synthesized pixel 162 has an original player index of P1, and synthesized pixel 166 has an original player index of P1. Other types of indexing systems may be used without departing from the scope of this disclosure.

As indicated at 170, each synthesized pixel in the synthesized depth image may include a pixel address. The pixel address may define the position of a pixel relative to other pixels. In the illustrated example, synthesized pixel 162 has a pixel address of [5,7], and synthesized pixel 166 has a pixel address of [4,8]. It is to be understood that other addressing schemes may be used without departing from the scope of this disclosure.

As indicated at 170, each synthesized pixel may optionally include other types of information, some of which may be obtained after rasterization. For example, each synthesized pixel may include an updated body-part index, which may be determined as part of a snap operation performed during rasterization, as described below, Each synthesized pixel may include an updated player index, which may be determined as part of a snap operation performed during rasterization. Each synthesized pixel may include an updated body-part index, which may be obtained as part of a grow/fix operation, as described below. Each synthesized pixel may include an updated player index, which may be obtained as part of a grow/fix operation, as described above.

The example types of pixel information provided above are not limiting. Various different types of information may be stored as part of each pixel. Such information can be stored as part of a common data structure, or the different types of information may be stored in different data structures that can be mapped to particular pixel locations (e.g., via a pixel address). As an example, player indices and/or body-part indices obtained as part of a snap operation during rasterization may be stored in a rasterization map and/or a snap map, while player indices and/or body-part indices obtained as part of a grow/fix operation after rasterization may be stored in a grow map, as described below. Nonlimiting examples of other types of pixel information that may be assigned to each pixel include, but are not limited to, joint indices, bone indices, vertex indices, triangle indices, centroid indices, and the like.

At 118, method 100 of FIG. 7 may optionally include snapping and/or growing the body-part indices and/or player indices. In other words, the synthesized depth image may be augmented so that the body-part index and/or player index of some pixels are changed in an attempt to more closely correspond to the modeled target.

In performing the above described rasterizations, one or more Z-Buffers and/or body-part/player index maps may be constructed. As a nonlimiting example, a first version of such a buffer/map may be constructed by performing a Z-test in which a surface closest to the viewer (e.g., depth camera) is selected and a body-part index and/or player index associated with that surface is written to the corresponding pixel. This map may be referred to as the rasterization map or the original synthesized depth map. A second version of such a buffer/map may be constructed by performing a Z-test in which a surface that is closest to an observed depth value at that pixel is selected and a body-part index and/or player index associated with that surface is written to the corresponding pixel. This may be referred to as the snap map. Such tests may be constrained so as to reject a Z-distance between a synthesized depth value and an observed depth value that is beyond a predetermined threshold. In some embodiments, two or more Z-buffers and/or two or more body-part/player index maps may be maintained, thus allowing two or more of the above described tests to be carried out.

A third version of a buffer/map may be constructed by growing and/or correcting a body-part/player index map. This may be referred to as a grow map. Starting with a copy of the snap map described above, the values may be grown over any "unknown" values within a predetermined Z-distance, so that a space being occupied by the target, but not yet occupied by the body model, may be filled with proper body-part/player indices. Such an approach may further include overtaking a known value if a more favorable match is identified.

The grow map may begin with a pass over synthesized pixels of the snap map to detect pixels having neighboring pixels with a different body-part/player index. These may be considered "edge" pixels, i.e., frontiers along which values may optionally be propagated. As introduced above, growing the pixel values may include growing into either "unknown" or "known" pixels. For "unknown" pixels, the body-part/player index value, for example, in one scenario, may have been zero before, but may now have a non-zero neighboring pixel. In such a case, the four direct neighboring pixels may be examined, and the neighboring pixel having an observed depth value more closely resembling that of the pixel of interest may be selected and assigned to the pixel of interest. In the case of "known" pixels, it may be possible that a pixel with a known nonzero body-part/player index value may be overtaken, if one of its neighboring pixels has a depth value written during rasterization that more closely matches the observed depth value of the pixel of interest than that of the synthesized depth value for that pixel.

Additionally, for efficiency, updating a body-part/player index value of a synthesized pixel may include adding its neighboring four pixels to a queue of pixels to be revisited on a subsequent pass. As such, values may continue to be propagated along the frontiers without doing an entire pass over all the pixels. As another optimization, different N×N blocks of pixels (e.g., 16×16 blocks of pixels) occupied by a target of interest can be tracked so that other blocks that are not occupied by a target of interest can be ignored. Such an optimization may be applied at any point during the target analysis after rasterization in various forms.

It is to be noted, however, that grow operations may take a variety of different forms. For example, various flood-fills may first be performed to identify regions of like values, and then it can be decided which regions belong to which body parts. Furthermore, the number of pixels that any body-part/player index object (e.g., left forearm body part bp4 of FIG. 3) can grow may be limited based on how many pixels such an object is expected to occupy (e.g., given its shape, distance and angle) vs. how many pixels in the snap map were assigned that body-part/player index. Additionally, the aforementioned approaches may include adding advantages or disadvantages, for certain poses, to bias the growth for certain body parts so that the growth may be correct.

A progressive snap adjustment can be made to the snap map if it is determined that a distribution of pixels from a body part is grouped at one depth, and another distribution of pixels from the same body part is grouped at another depth, such that a gap exists between these two distributions. For example, an arm waving in front of a torso, and near to that torso, may "spill into" the torso. Such a case may yield a group of torso pixels with a body-part index indicating that they are arm pixels, when in fact they should be torso pixels. By examining the distribution of synthesized depth values in the lower arm, it may be determined that some of the arm pixels may be grouped at one depth, and the rest may be grouped at another depth. The gap between these two groups of depth values indicates a jump between arm pixels and what should be torso pixels. Thus, in response to identifying such a gap, the spillover may then be remedied by assigning torso body-part indices to the spillover pixels. As another example, a progressive snap adjustment can be helpful in an arm-over-background-object case. In this case, a histogram can be used to identify a gap in the observed depth of the pixels of interest (i.e., pixels thought to belong to the arm). Based on such a gap, one or more groups of pixels can be identified as properly belonging to an arm and/or other group(s) can be rejected as background pixels. The histogram can be based on a variety of metrics, such as absolute depth; depth error (synthesized depth−observed depth), etc. The progressive snap adjustment may be performed in-line during rasterization, prior to any grow operations.

At 120, method 100 of FIG. 7 may optionally include creating a height map from the observed depth image, the synthesized depth image, and the body-part/player index maps at the three stages of processing described above. The gradient of such a height map, and/or a blurred version of such a height map, may be utilized when determining the directions of adjustments that are to be made to the model, as described hereafter. The height map is merely an optimization, however; alternatively or additionally, a search in all directions may be performed to identify nearest joints where adjustments may be applied and/or the direction in which such adjustments are to be made. When a height map is used, it may be created before, after, or in parallel to the pixel class determinations described below. When used, the height map is designed to set the player's actual body at a low elevation and the background elements at a high elevation. A watershed-style technique can then be used to trace "downhill" in the height map, to find the nearest point on the player from the background, or vice versa (i.e., seek "uphill" in the height map to find the nearest background pixel to a given player pixel).

The synthesized depth image and the observed depth image may not be identical, and thus the synthesized depth image can use adjustments and or modifications so that it more closely matches an observed depth image and can thus more accurately represent the target. It is to be understood that adjustments can be made to the synthesized depth image by first making adjustments to the model (e.g., change the pose of the model), and then synthesizing the adjusted model into a new version of the synthesized depth image. Such adjustments can be used to find a model-fitting pose that more accurately represents the observed pose of the target.

A number of different approaches may be taken to modify a synthesized depth image. In one approach, two or more different models may be obtained and rasterized to yield two or more synthesized depth images. Each synthesized depth image may then be compared to the observed depth image by a predetermined set of comparison metrics. The synthesized depth image demonstrating a closest match to the observed depth image may be selected, and this process may be optionally repeated in order to improve the model. When used, this process can be particularly useful for refining the body model to match the player's body type and/or dimensions.

In another approach, the two or more synthesized depth images may be blended via interpolation or extrapolation to yield a blended synthesized depth image. In yet another approach, two or more synthesized depth images may be blended in such a way that the blending techniques and parameters vary across the blended synthesized depth image. For example, if a first synthesized depth image is favorably matched to the observed depth image in one region, and a second synthesized depth image is favorably matched in a second region, the pose selected in the blended synthesized depth image could be a mixture resembling the pose used to create the first synthesized depth image in the first region, and the pose used to create the second synthesized depth image in the second region.

In yet another approach, and as indicated at 122 in FIG. 7, the synthesized depth image may be compared to the observed depth image. Each synthesized pixel of the synthesized depth image may be classified based on the results of the comparison. Such classification may be referred to as determining the pixel case for each pixel. The model used to create the synthesized depth image (e.g., body model 70 of FIG. 3) may be systematically adjusted in accordance with the determined pixel cases. In particular, a force vector (magnitude and direction) may be calculated at each pixel based on the determined pixel case and, depending on the type of model, the computed force vector can be applied to a nearest joint, a centroid of a body part, a point on a body part, a vertex of a triangle, or another predetermined force-receiving location of the model used to generate the synthesized depth image. In some embodiments, the force attributed to a given pixel can be distributed between two or more force-receiving locations on the model.

One or more pixel cases may be selected for each synthesized pixel based on one or more factors, which include, but are not limited to—the difference between an observed depth value and a synthesized depth value for that synthesized pixel; the difference between the original body-part index, the (snap) body-part index, and/or the (grow) body/part index for that synthesized pixel; and/or the difference between the original player index, the (snap) player index, and/or the (grow) player index for that synthesized pixel.

As indicated at 124 of FIG. 7, determining a pixel case may include selecting a refine-z pixel case. The refine-z pixel case may be selected when the observed depth value of an observed pixel (or in a region of observed pixels) of the observed depth image does not match the synthesized depth value(s) in the synthesized depth image, but is close enough to likely belong to the same object in both images, and the body-part indices match (or, in some cases, correspond to neighboring body parts or regions). A refine-z pixel case may be selected for a synthesized pixel if a difference between an observed depth value and a synthesized depth value for that synthesized pixel is within a predetermined range and, optionally, if that synthesized pixel's (grow) body party index corresponds to a body part that has not been designated for receiving magnetism forces. The refine-z pixel case corresponds to a computed force vector that may exert a force on the model to move the model into the correct position. The computed force vector may be applied along the Z axis perpendicular to the image plane, along a vector normal to an aspect of the model (e.g., face of the corresponding body part), and/or along a vector normal to nearby observed pixels. The magnitude of the force vector is based on the difference in the observed and synthesized depth values, with greater differences corresponding to larger forces. The force-receiving location to which the force is applied can be selected to be the nearest qualifying force-receiving location to the pixel of interest (e.g., nearest torso joint), or the force can be distributed among a weighted blend of the nearest force-receiving locations. The nearest force-receiving location may be chosen, however, in some cases, the application of biases can be helpful. For example, if a pixel lies halfway down the upper leg, and it has been established that the hip joint is less mobile (or agile) than the knee, it may be helpful to bias the joint forces for mid-leg pixels to act on the knee rather than the hip.

The determination of which force-receiving location is nearest to the pixel of interest can be found by a brute-force search, with or without the biases mentioned above. To accelerate the search, the set of force-receiving locations searched may be limited to only those on or near the body part that is associated with the body-part index of this pixel. BSP (binary space partitioning) trees may also be set up, each time the pose is changed, to help accelerate these searches. Each region on the body, or each body part corresponding to a body-part index, may be given its own BSP tree. If so, the biases can be applied differently for each body part, which further enables wise selection of the proper force-receiving locations.

As indicated at 126 of FIG. 7, determining a pixel case may include selecting a magnetism pixel case. The magnetism pixel case may be utilized when the synthesized pixel being examined, in the (grow/) map corresponds to a predetermined subset of the body parts (e.g., the arms, or bp3, bp4, bp5, bp7, bp8, and bp9 of FIG. 3). While the arms are provided as an example, other body parts, such as the legs or the entire body, may optionally be associated with the magnetism pixel case in some scenarios. Likewise, in some scenarios, the arms may not be associated with the magnetism pixel case.

The pixels marked for the magnetism case may be grouped into regions, each region being associated with a specific body part (such as, in this example, upper left arm, lower left arm, left hand, and so on). Which region a pixel belongs to can be determined from its body-part index, or, a more accurate test can be performed (to reduce error potentially introduced in the grow operation) by comparing the pixel's position to various points in or on the body model (but not restricted to the body part indicated by the pixel's body-part index). For example, for a pixel somewhere on the left arm, various metrics can be used to determine to which bone segment (shoulder-to-elbow, elbow-to-wrist, or wrist-to-tip-of-hand) the pixel is the most likely to belong. Each of these bone segments may be considered a "region".

For each of these magnetism regions, centroids of the pixels belonging to the region may be computed. These centroids can be either orthodox (all contributing pixels are weighted equally), or biased, where some pixels carry more weight than others. For example, for the upper arm, three centroids may be tracked: 1) an unbiased centroid, 2) a "near" centroid, whose contributing pixels are weighted more heavily when they are closer to the shoulder; and 3) a "far" centroid, whose contributing pixels are weighted more heavily when closer to the elbow. These weightings may be linear (e.g., 2×) or nonlinear (e.g., $x^2$) or follow any curve.

Once these centroids are computed, a variety of options are available (and can be chosen dynamically) for computing the position and orientation of the body part of interest, even if some are partially occluded. For example, when trying to determine the new position for the elbow, if the centroid in that area is sufficiently visible (if the sum of the weights of the contributing pixels exceeds a predetermined threshold), then the centroid itself marks the elbow (estimate #1). However, if the elbow area is not visible (perhaps because it is occluded by some other object or body part), the elbow location can still often be determined, as described in the following nonlimiting example. If the far centroid of the upper arm is visible, then a projection can be made out from the shoulder, through this centroid, by the length of the upper arm, to obtain a very likely position for the elbow (estimate #2) If the near centroid of the lower arm is visible, then a projection can be made up from the wrist, through this centroid, by the length of the lower arm, to obtain a very likely position for the elbow (estimate #3).

A selection of one of the three potential estimates can be made, or a blend between the three potential estimates may be made, giving priority (or higher weight) to the estimates that have higher visibility, confidence, pixel counts, or any number of other metrics. Finally, in this example, a single force vector may be applied to the model at the location of the elbow; however, it may be more heavily weighted (when accumulated with the pixel force vectors resulting from other pixel cases, but acting on this same force-receiving location), to represent the fact that many pixels were used to construct it. When applied, the computed force vector may move the model so that the corresponding model more favorably matches the target shown in the observed image. An advantage of the magnetism pixel case is its ability to work well with highly agile body parts, such as arms.

In some embodiments, a model without defined joints or body parts may be adjusted using only the magnetism pixel case.

As indicated at 128 and at 130 of FIG. 7, determining a pixel case may include selecting a pull pixel case and/or a push pixel case. These pixel cases may be invoked at the silhouette, where the synthesized and observed depth values may be severely mismatched at the same pixel address. It is noted that the pull pixel case and the push pixel case can also be used when the original player index does not match the (grow) player index. The determination of push vs. pull is as follows. If the synthesized depth image contains a depth value that is less than (closer than) the depth value in the observed depth image at that same pixel address, then the model can be pulled toward the true silhouette seen in the grown image. Conversely, if the original synthesized image contains a depth value that is greater than (farther than) the depth value in the observed depth image, then the model can be pushed out of the space that the player no longer occupies (and toward the real silhouette in the grown image). In either case, for each of these pixels or pixel regions, a two- or three-dimensional computed force vector may be exerted on the model to correct the silhouette mismatch, either pushing or pulling parts of the body model into a position that more accurately matches the position of the target in the observed depth image. The direction of such pushing and/or pulling is often predominantly in the XY plane, although a Z component can be added to the force in some scenarios.

In order to produce the proper force vector for a pull or push case, the nearest point on either the player silhouette in the synthesized depth image (for a pull case), or on the player silhouette in the observed depth image (for a push case) may first be found. This point can be found, for each source pixel (or for each group of source pixels), by performing a brute-force, exhaustive 2D search for the nearest point (on the desired silhouette) that meets the following criteria. In the pull pixel case, the closest pixel with a player index in the original map (at the seek position) that matches the player index in the grown map (at the source pixel or region) is found. In the push pixel case, the closest pixel with a player index in the grown map (at the seek position) that matches the player index in the original map (at the source pixel or region) is found.

However, a brute force search can be very computationally expensive, and optimizations can be used to reduce computational expense. One non-limiting example optimization for finding this point more efficiently is to follow the gradient of the above described height map, or a blurred version thereof, and to only examine pixels in a straight line, in the direction of the gradient. In this height map, the height values are low where the player index is the same in both the original and grown player index maps, and the height values are high where the player index (in both maps) is zero. The gradient can be defined as the vector, at any given pixel, pointing "downhill" in this height map. Both pull and push pixels can then seek along this gradient (downhill) until they reach their respective stopping condition, as described above. Other basic optimizations for this seek operation include skipping pixels, using interval halving, or using a slope-based approach; re-sampling the gradient, at intervals, as the seek progresses; as well as checking nearby for better/closer matches (not directly along the gradient) once the stopping criteria are met.

No matter what technique is used to find the nearest point on the silhouette of interest, the distance traveled (the distance between the source pixel and the silhouette pixel), D1, may be used to calculate the magnitude (length), D2, of the force vector that will push or pull the model. In some embodiments, D2 may be linearly or nonlinearly related to D1 (e.g., D2=2*D1 or D2=D1$^2$). As one nonlimiting example, the following formula can be sued: D2=(D1−0.5 pixels)*2. For example, if there is a 5-pixel gap between the silhouette in the two depth images, each pixel in this gap may perform a small "seek" and produce a force vector. The pixels near the real silhouette may seek by only 1 pixel to reach the silhouette, so the force magnitude at those pixels will be (1−0.5)*2=1. The pixels far from the real silhouette may seek by 5 pixels, so the force magnitude will be (5−0.5)*2=9. In general, going from the pixels closest to the real silhouette to those farthest, the seek distances will be D1={1, 2, 3, 4, 5} and the force magnitudes produced will be: D2={1, 3, 5, 7, 9}. The average of D2 in this case is 5, as desired—the average magnitudes of the resulting force vectors are equivalent to the distance between the silhouettes (near each force-receiving location), which is the distance that the model can be moved to put the model in the proper place.

The final force vector, for each source pixel, may then be constructed with a direction and a magnitude (i.e., length). For pull pixels, the direction is determined by the vector from the silhouette pixel to the source pixel; for push pixels, it is the opposite vector. The length of this force vector is D2. At each pixel, then, the force may be applied to a best-qualifying (e.g., nearest) force-receiving location (or distributed between several), and these forces can be averaged, at each force-receiving location, to produce the proper localized movements of the body model.

As indicated at 132 and at 134 of FIG. 7, determining a pixel case may include selecting a self-occluding push and/or pull pixel case. Whereas in the above-mentioned push and pull pixel cases a body part may be moving in the foreground relative to a background or another target, the self-occluding push and pull pixel cases consider the scenarios where the body part is in front of another body part of the same target (e.g., one leg in front of another, arm in front of torso, etc.). These cases may be identified when the pixel's (snap) player index matches its corresponding (grow) player index, but when the (snap) body-part index does not match its corresponding (grow) body-part index. In such cases, the seek direction (to find the silhouette) may be derived in several ways. As nonlimiting examples, a brute-force 2D search may be performed; a second set of "occlusion" height maps may be tailored for this case so that a gradient can guide a 1D search; or the direction may be set toward the nearest point on the nearest skeletal member. Details for these two cases are otherwise similar to the standard pull and push cases.

Push, pull, self-occluding push, and/or self-occluding pull pixel cases may be selected for a synthesized pixel if that synthesized pixel's (grow) body party index corresponds to a body part that has not been designated for receiving magnetism forces.

It is to be understood that in some scenarios a single pixel may be responsible for one or more pixel cases. As a nonlimiting example, a pixel may be responsible for both a self-occluding push pixel force and a refine-z pixel force, where the self-occluding push pixel force is applied to a force-receiving location on the occluding body part and the refine-z pixel force is applied to a force-receiving location on the body part being occluded.

As indicated at 136 of FIG. 7, determining a pixel case may include selecting no pixel case for a synthesized pixel. Oftentimes a force vector will not need to be calculated for all synthesized pixels of the synthesized depth image. For example, synthesized pixels that are farther away from the body model shown in the synthesized depth image, and observed pixels that are farther away from the target shown in the observed depth image (i.e., background pixels), may not influence any force-receiving locations or body parts. A pixel case need not be determined for such pixels, although it can be in some scenarios. As another example, a difference between an observed depth value and a synthesized depth value for that synthesized pixel may be below a predetermined threshold value (e.g., the model already matches the observed image). As such, a pixel case need not be determined for such pixels, although it can be in some scenarios.

The table provided in FIG. 15 details an example relationship between the pixel cases described above and the joints illustrated in skeletal model 82 of FIG. 5. Pixel cases 1-7 are abbreviated in the table as follows: 1—Pull (regular), 2—Pull (occlusion), 3—Push (regular), 4—Push (occlusion), 5—Refine-Z, 6—Magnetic Pull, and 7—Occlusion (no action). A "Yes" entry in the "Receives Forces?" column indicates that the joint of that row may receive forces from a force vector. An "X" entry in a pixel cases column denotes that the joint of that row may receive a force from a force vector corresponding to the pixel case of that column. It is to be understood that the table illustrated in FIG. 15 is provided as an example. It is not to be considered limiting. Other relationships between models and pixel cases may be established without departing from the scope of this disclosure.

At 140, method 100 of FIG. 7 includes, for each synthesized pixel for which a pixel case has been determined, computing a force vector based on the pixel case selected for that synthesized pixel. As described above, each pixel case corresponds to a different algorithm and/or methodology for selecting the magnitude, direction, and/or force-receiving location of a force vector. The force vectors may be computed and/or accumulated in any coordinate space, such as world space, screen space (pre-Z-divide), projection space (post-Z-divide), model space, and the like.

At 142, method 100 includes mapping each computed force vector to one or more force-receiving locations of the model. Mapping may include mapping a computed force vector to a "best-matching" force-receiving location. The selection of a best-matching force-receiving location of the model is dependent on the pixel case selected for the corresponding pixel. The best-matching force-receiving location may be the nearest joint, vertex, or centroid, for example. In some embodiments, moments (i.e., rotational forces) may be applied to a model.

In general, translations may result from forces with similar directions acting on the force-receiving locations of a model, and rotations may result from forces of different directions acting on the force-receiving locations of a model. For deformable objects, some of the components of the force vectors may be used to deform the model within its deformation limits, and the remaining components of the force vectors may be used to translate and/or rotate the model.

In some embodiments, force vectors may be mapped to the best-matching rigid or deformable object, sub-object, and/or set of polygons of an object. Accordingly, some of the force vectors may be used to deform the model, and the remaining components of the force vectors may be used to perform rigid translation of the model. Such a technique may result in a "broken" model (e.g., an arm could be severed from the body). As discussed in more detail below, a rectification step may then be used to transform translations into rotations and/or apply constraints in order to connect body parts back together along a low-energy path.

In some embodiments one or more target extremities may be identified (e.g., relative to a middle or core of the target). For example, during actions of interest, hands and feet may diverge away from the torso. These highly diverging parts may be flagged or otherwise determined to be points of interest that have a high probability of corresponding to a hand or foot. By combining these points of interest with constraints, previous position, or other output from a model or prediction system regarding the target pose, such an extremity detector can be used to either construct or validate a pose.

FIGS. 11A and 11B shows a very simplified example of applying force vectors to a model—in the illustrated example, a skeletal model 180. For the sake of simplicity, only two force vectors are shown in the illustrated example. Each such force vector may be the result of the summation of two or more different force vectors resulting from the pixel case determinations and force vector calculations of two or more different pixels. Often times, a model will be adjusted by many different force vectors, each of which is the sum of many different force vectors resulting from the pixel case determinations and force vector calculations of many different pixels.

FIG. 11A shows a skeletal model 180, where force vector 182 is to be applied to joint j18 (i.e., an elbow) and force vector 184 is to be applied to joint j20 (i.e., a wrist), for the purpose of straightening one arm of skeletal model 180 to more closely match an observed depth image. FIG. 11B shows skeletal model 180 after the forces are applied. FIG. 11B illustrates how the applied forces adjust the pose of the model. As shown in FIG. 11B, the lengths of the skeletal members may be preserved. As further shown, the position of joint j2 remains at the shoulder of the skeletal model, as expected for the case of a human straightening their arm. In other words, the skeletal model remains intact after the forces have been applied. Maintaining the integrity of the skeletal model when applying forces results from one or more constraints being applied, as discussed in more detail hereafter. A variety of different constraints can be enforced to maintain the integrity of different possible model types.

At 144, method 100 of FIG. 7 optionally includes rectifying the model to a pose satisfying one or more constraints. As described above, after collecting and mapping the computed force vectors to the force-receiving locations of the model, the computed force vectors may then be applied to the model. If performed without constraint, this may "break" the model, stretching it out of proportion and/or moving body parts into invalid configurations for the actual body of the target. Iterations of various functions may then be used to "relax" the new model position into a "nearby" legal configuration. During each iteration of rectifying the model, constraints may be gently and/or gradually applied to the pose, in order to limit the set of poses to those that are physically expressible by one or more actual bodies of one or more targets. In other embodiments, such a rectifying step may be done in a non-iterative manner.

In some embodiments, the constraints may include one or more of skeletal member length constraints, joint angle constraints, polygon edge angle constraints, and collision tests, as described hereafter.

As an example in which a skeletal model is used, skeletal member (i.e., bone) length constraints can be applied. Force vectors that can be detected (i.e., force vectors at locations where joints and/or body parts are visible and not occluded) may be propagated along a network of skeletal members of the skeletal model. By applying skeletal member length constraints, the propagated forces may "settle in" once all of the skeletal members are of acceptable lengths. In some embodiments, one or more of the skeletal member lengths are allowed to be variable within a predetermined range. For example, the length of skeletal members making up the sides of the torso may be variable to simulate a deformable midsection. As another example, the length of skeletal members making up the upper-arm may be variable to simulate a complex shoulder socket.

A skeletal model may additionally or alternatively be constrained by computing a length of each skeletal member based on the target, such that these lengths may be used as constraints during rectification. For example, the desired bone lengths are known from the body model; and the difference between the current bone lengths (i.e., distances between new joint positions) and the desired bone lengths can be assessed. The model can be adjusted to decrease any error between desired lengths and current lengths. Priority may be given to certain joints and/or bones that are deemed more important, as well as joints or body parts that are currently more visible than others. Also, high-magnitude changes may be given priority over low-magnitude changes.

Joint visibility and/or confidence may be separately tracked in the X, Y, and Z dimensions to allow more accurate application of bone length constraints. For example, if a bone connects the chest to the left shoulder, and the chest joint's Z position is high-confidence (i.e., many refine-z pixels correspond to the joint) and the shoulder's Y-position is high-confidence (many push/pull pixels correspond to the joint), then any error in the bone length may be corrected while partially or fully limiting movement of the shoulder in the Y direction or the chest in the Z direction.

In some embodiments, joint positions prior to rectification may be compared to joint positions after rectification. If it is determined that a consistent set of adjustments is being made to the skeletal model in every frame, method 100 may use this information to perform a "progressive refinement" on the skeletal and/or body model. For example, by comparing joint positions before and after rectification it may be determined that in each frame the shoulders are being pushed wider apart during rectification. Such a consistent adjustment suggests that the shoulders of the skeletal model are smaller than that of the target being represented, and consequently, the shoulder width is being adjusted each frame during rectification to correct for this. In such a case, a progressive refinement, such as increasing the shoulder width of the skeletal model, may be made to correct the skeletal and/or body model to better match the target.

In regards to joint angle constraints, certain limbs and body parts may be limited in their range of motion relative to an adjacent body part. Additionally, this range of motion may change based on the orientation of adjacent body parts. Thus, applying joint angle constraints may allow limb segments to be constrained to possible configurations, given the orientation of parent limbs and/or body parts. For example, the lower leg can be configured to bend backwards (at the knee), but not forwards. If illegal angles are detected, the offending body part(s) and/or their parents (or, in the case of a mesh model, the offending triangles and their neighbors) are adjusted to keep the pose within a range of predetermined possibilities, thus helping avoid the case where the model collapses into a pose that is deemed to be unacceptable. In certain cases of extreme angle violations, the pose may be recognized as backwards, i.e., what is being tracked as the chest is really the player's back; the left hand is really the right hand; and so on. When such an impossible angle is clearly visible (and sufficiently egregious), this can be interpreted to mean that the pose has been mapped backwards onto the player's body, and the pose can be flipped to accurately model the target.

Collision tests may be applied to prevent the model from interpenetrating itself. For example, collision tests may prevent any part of the forearms/hands from penetrating the torso, or prevent the forearms/hands from penetrating each other. In other examples, collision tests may prevent a leg from penetrating the other leg. In some embodiments, collision tests may be applied to models of two or more players to prevent similar scenarios from occurring between models. In some embodiments, collision tests may be applied to a body model and/or a skeletal model. In some embodiments, collision tests may be applied to certain polygons of a mesh model.

Collision tests may be applied in any suitable manner. One approach examines collisions of one "volumetric line segment" vs. another, where a volumetric line segment may be a line segment with a radius that extends out in 3-D. An example of such a collision test may be examining a forearm vs. another forearm. In some embodiments, the volumetric line segment may have a different radius at each end of the segment.

Another approach examines collisions of a volumetric line segment vs. a posed polygonal object. An example of such a collision test may be examining a forearm vs. a torso. In some embodiments, the posed polygonal object may be a deformed polygonal object.

In some embodiments, knowledge that different portions of a target can move a limited distance in a time frame (e.g., $1/30^{th}$ or $1/60^{th}$ of a second) can be used as a constraint. Such a constraint may be used to rule out certain poses resulting from application of forces to pixel-receiving locations of the model.

As indicated at 145, after the model has been adjusted and optionally constrained, the process can loop back to begin a new rasterization of the model into a new synthesized depth image, which may then be compared to the observed depth image so that further adjustments can be made to the model. In this way, the model can be progressively adjusted to more closely represent the modeled target. Virtually any number of iterations can be completed each frame. More iterations may achieve more accurate results, but more iterations also may demand more computing overhead. It is believed that two or three iterations per frame is appropriate in many scenarios, although one iteration may be sufficient in some embodiments.

A posed model acquired using the above described model fitting process, or a rasterized version thereof, may be compared to the observed depth image in order to assess a relative confidence in the acquired pose. Such a confidence may be assessed per joint, body part, or pixel, or the confidence may be assessed for the model as a whole.

As indicated at 146, a posed model acquired via model fitting can optionally be compared to a posed model acquired via exemplar. In particular, one or more confidence tests can be used to determine which pose is believed to be a more accurate representation of the target. When such a comparison is made, the pose that is believed to be more accurate can be selected while the other pose is discarded and/or saved to facilitate subsequent pose determinations. In some embodiments, high-confidence aspects of one pose may be combined with high-confidence aspects of the other pose to produce a combined pose that is believed to be a better representation of the target than either the model obtained via model fitting or the model obtained via exemplar. It is to be understood that in some embodiments, model fitting, as discussed with reference to steps 116-145 of FIG. 7, may be skipped if the relative confidence in the exemplar pose is above a predetermined threshold.

Figure 13:
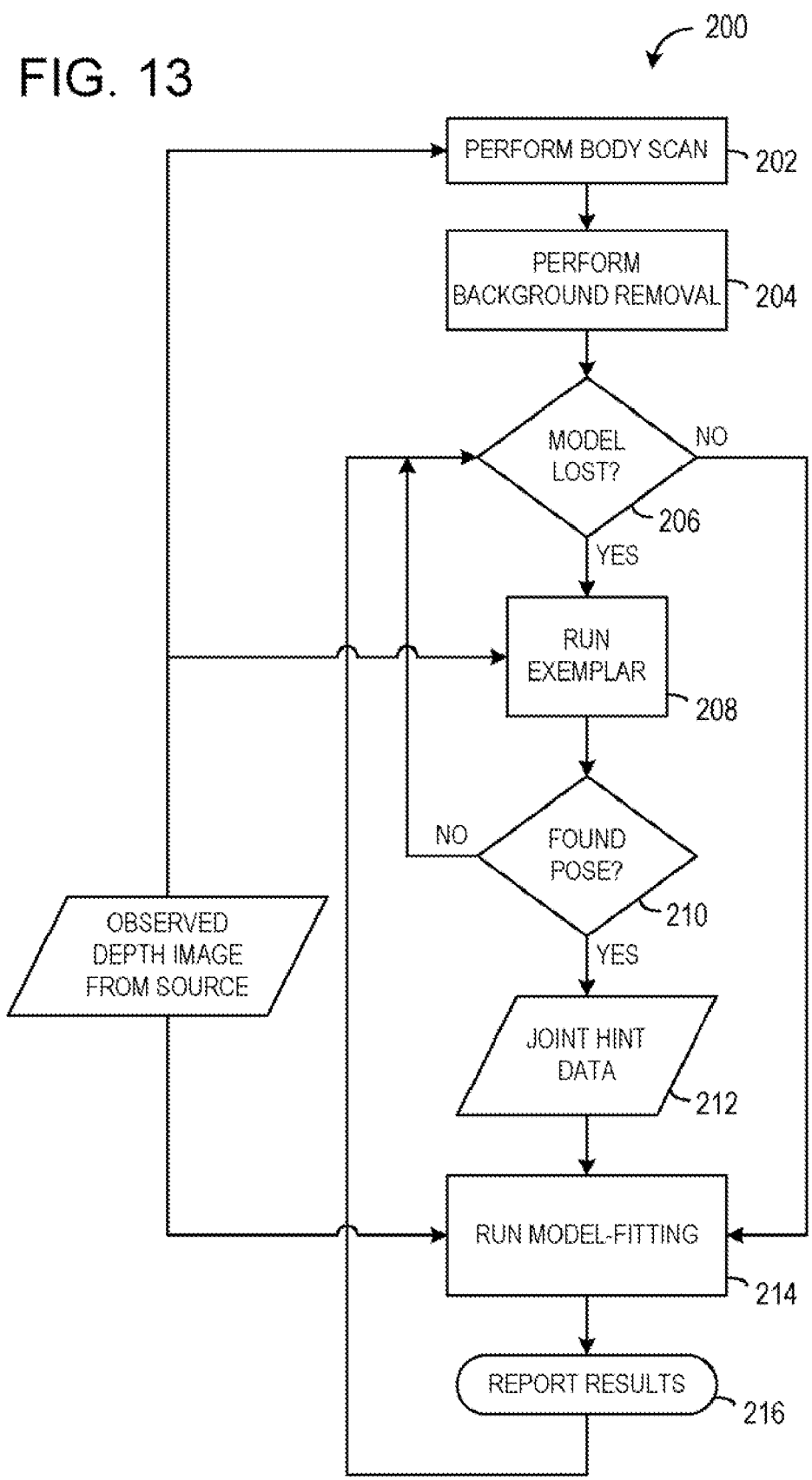
FIG. 13 shows an example process flow of a target tracking method that uses exemplar and model fitting.
Figure 14:
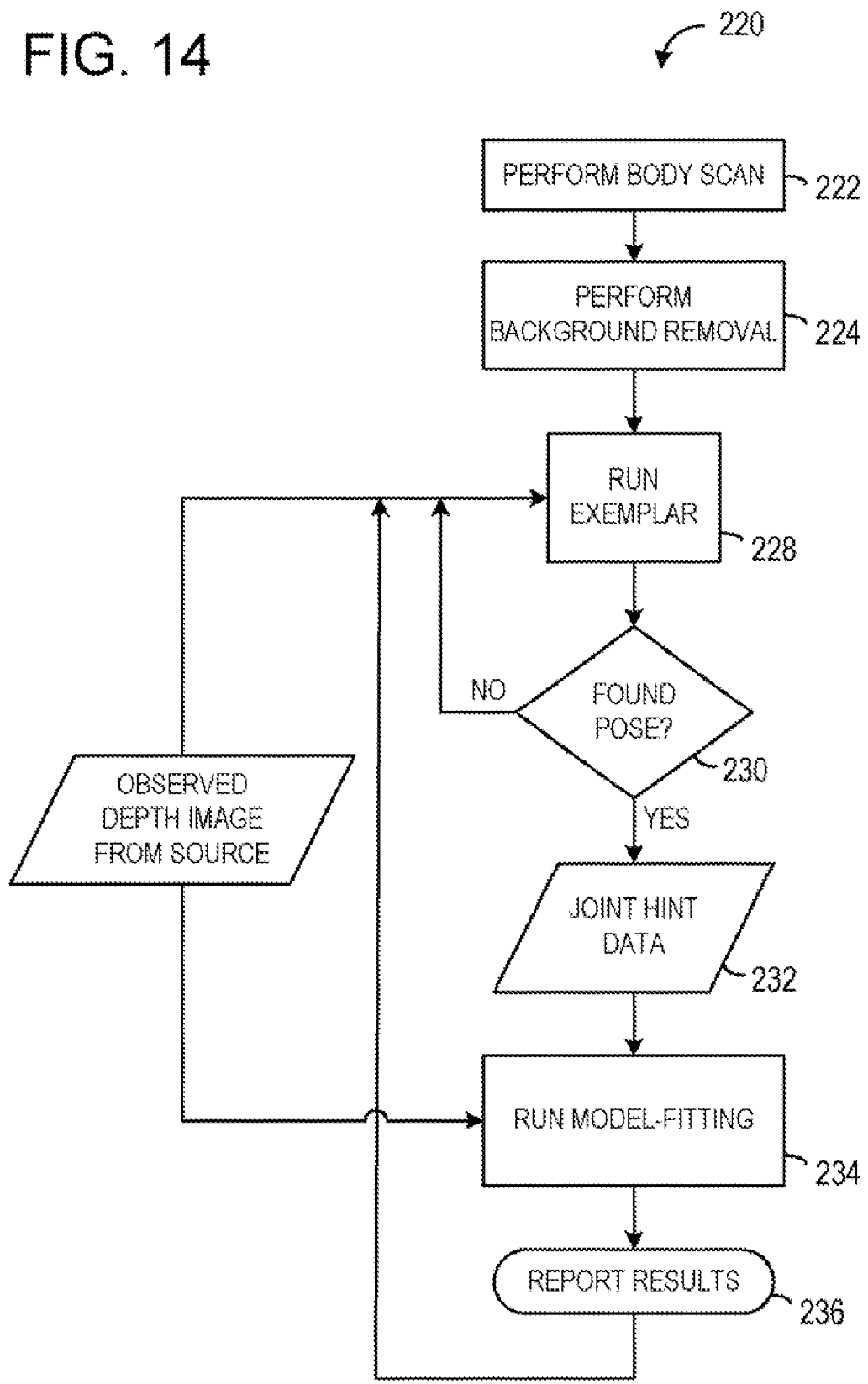
FIG. 14 shows another example process flow of a target tracking method that uses exemplar and model fitting.

The relative frequency of when an exemplar pose, a model-fitting pose, or a combined pose are tested and/or chosen can be varied without departing from the scope of this disclosure. In some embodiments, a pose acquired via model fitting can be tested against a pose acquired via exemplar every frame. In other embodiments, such a comparison may only be carried out every nth frame, anytime the target moves or changes poses by more than a threshold, or every time confidence in either the model fitting model or the exemplar model falls below a threshold. FIGS. 13 and 14 provide nonlimiting example process flows for selecting a pose from exemplar or model fitting.

Figure 12A:
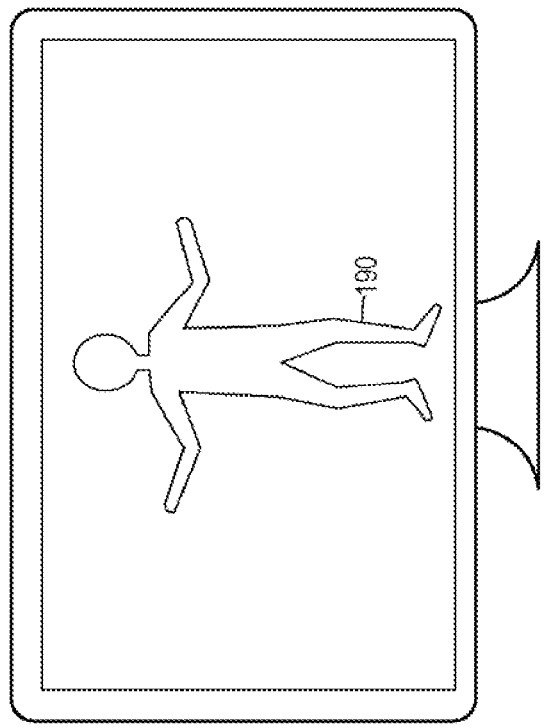
FIG. 12A shows a player avatar rendered from the model of FIG. 11A.
Figure 12B:
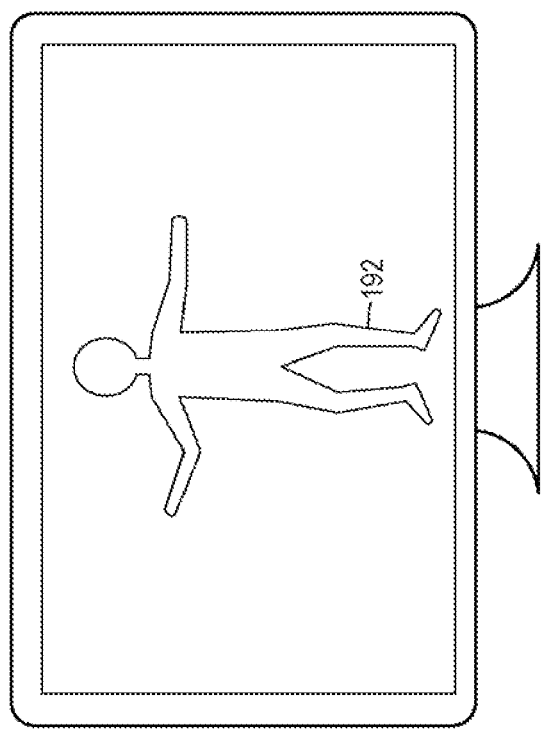
FIG. 12B shows a player avatar rendered from the model of FIG. 11B.

At 147, method 100 of FIG. 7 optionally includes changing the visual appearance of an on-screen character (e.g., player avatar 190 of FIG. 12A) responsive to changes to the model, such as changes shown in FIG. 11B. For example, a user playing an electronic game on a gaming console (e.g., gaming system 12 of FIGS. 1A and 1B) may be tracked by the gaming console as described herein. In particular, a body model (e.g., body model 70 of FIG. 3) including a skeletal model (e.g., skeletal model 180 of FIG. 11A) may be used to model the target game player, and the body model may be used to render an on-screen player avatar. As the game player straightens one arm, the gaming console may track this motion, then in response to the tracked motion, adjust the model 180 as depicted in FIG. 11B. The gaming console may also apply one or more constraints, as described above. Upon making such adjustments and applying such constraints, the gaming console may display the adjusted player avatar 192, as shown in FIG. 12B. This is also shown by way of example in FIG. 1A, in which player avatar 24 is shown punching boxing opponent 22 responsive to game player 18 throwing a punch in real space.

As discussed above, visual target recognition can be performed for purposes other than changing the visual appearance of an on-screen character or avatar. As such, the visual appearance of an on-screen character or avatar need not be changed in all embodiments. As discussed above, target tracking can be used for virtually limitless different purposes, many of which do not result in the changing of an on-screen character. The target tracking and/or the pose of the model, as adjusted, can be used as a parameter to affect virtually any element of an application, such as a game.

As indicated at 148, the above described process can be repeated for subsequent frames.

As discussed above, body scanning and/or background removal can be used to obtain a rough model of a target and model fitting and/or exemplar can be used to find a pose of the model and to track changing poses of the model from frame to frame.

FIG. 13 shows an example process flow 200 of a target tracking method that uses exemplar to pass joint hints to model fitting only if the model fitting is lost or deemed to be below a predetermined confidence threshold. Using the approach of FIG. 13, if the model fitting is not lost or deemed to be of too low of confidence, model fitting is used to fit the next frame.

At 202, a body scan is performed to identify one or more human targets. Such a scan may take one or more frames. At 204, background removal can be performed to facilitate tracking of an identified human target. At 206, it is determined if the model has been lost or confidence in the model from a previous frame is too low relative to the current observed depth image. If the model has not been lost, the process moves to step 214. If the model has been lost, at 208, the observed depth image is systematically analyzed using the exemplar process in order to find joint locations of a model and associated confidences that such joint locations are correct. At 210, it is determined if the relative confidences of the joint locations are high enough to suggest that a likely pose has been acquired. If not, processing may return to step 206, where the analysis can be repeated using an updated observed depth image and/or different parameters in the analysis. If confidence is high enough to suggest that exemplar found a pose, processing may pass to 212, where the joint locations and/or confidences can be passed to the model fitting portion of the processing pipeline. At 214, model fitting may be executed as described above with reference to FIG. 7, using the information from exemplar. At 216, the exemplar pose, the model-fitting pose, or a combination thereof may be reported and the process may be repeated.

FIG. 14 shows an example process flow 220 of a target tracking method that uses exemplar on every frame, or alternatively, at selected frames, to pass joint information to model fitting.

At 222, a body scan is performed to identify one or more human targets. Such a scan may take one or more frames. At 224, background removal can be performed to facilitate tracking of an identified human target. At 228, an observed depth image is systematically analyzed using the exemplar process in order to find joint locations of a model and associated confidences that such joint locations are correct. At 230, it is determined if the relative confidences of the joint locations are high enough to suggest that a likely pose has been acquired. If not, processing may return to step 228, where the analysis can be repeated using an updated observed depth image and/or different parameters in the analysis. If confidence is high enough to suggest that exemplar found a pose, processing may pass to 232, where the joint locations and/or confidences can be passed to the model fitting portion of the processing pipeline. At 234, model fitting may be executed as described above with reference to FIG. 7, using the information from exemplar. At 236, the exemplar pose, the model-fitting pose, or a combination thereof may be reported and the process may be repeated.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of tracking a human target, the method comprising:
   receiving an observed depth image of a scene from a source;
   body scanning the scene to identify a human target in the scene;
   removing non-target background information from the observed depth image;
   applying to the observed depth image one or more decision trees trained from a collection of known poses to find an exemplar pose that represents an observed pose of the human target;
   rasterizing a body model of the human target into a synthesized depth image having a rasterized pose;
   adjusting the rasterized pose of the body model into a model-fitting pose based, at least in part, on differences between the observed depth image and the synthesized depth image;
   comparing a confidence in the exemplar pose to a confidence in the model-fitting pose;
   selecting the exemplar pose if the confidence in the exemplar pose is higher than or equal to the confidence in the model-fitting pose; and
   selecting the model-fitting pose if the confidence in the model-fitting pose is higher than the confidence in the exemplar pose.

2. The method of claim 1, where a terminal node of a decision tree yields a best-guess of a body part for a pixel and a confidence that the best-guess is correct.

3. The method of claim 1, where removing non-target background information from the observed depth image includes removing depth image information outside of a sphere surrounding the target.

4. The method of claim 1, further comprising analyzing the observed depth image with a hand-identifying algorithm configured to identify hands on the human target; and
   increasing relative confidence of the exemplar pose if the exemplar pose more closely places hands in a same location as the hand-identifying algorithm; and
   increasing relative confidence of the model-fitting pose if the model-fitting pose more closely places hands in a same location as the hand-identifying algorithm.

5. A method of tracking a target, the method comprising:
   receiving an observed depth image of a target from a source;
   analyzing the observed depth image with a prior-trained collection of known poses to find an exemplar pose that represents an observed pose of the target;
   rasterizing a model of the target into a synthesized depth image having a rasterized pose;
   adjusting the rasterized pose of the model into a model-fitting pose based, at least in part, on differences between the observed depth image and the synthesized depth image; and
   selecting the exemplar pose or the model-fitting pose.

6. The method of claim 5, further comprising analyzing the observed depth image with a hand-identifying algorithm configured to identify hands on the target; and
   biasing selection of the exemplar pose or the model-fitting pose toward a pose that more closely places hands in a same location as the hand-identifying algorithm.

7. The method of claim 5, further comprising body scanning a scene of the observed depth image to identify the target.

8. The method of claim 5, further comprising removing non-target background information from the observed depth image.

9. The method of claim 8, where removing non-target background information from the observed depth image includes removing depth image information outside of a three-dimensional buffer surrounding the target.

10. The method of claim 8, where removing non-target background information from the observed depth image includes removing depth image information outside of a sphere surrounding the target.

11. The method of claim 5, where the source includes a depth camera.

12. The method of claim 5, where the source includes stereo cameras.

13. The method of claim 5, where analyzing the observed depth image with a prior-trained collection of known poses includes applying to the observed depth image one or more decision trees trained from the prior-trained collection of known poses.

14. The method of claim 13, where a terminal node of a decision tree yields a best-guess of a body part for a pixel and a confidence that the best-guess is correct.

15. The method of claim 14, further comprising locating each joint position of the exemplar pose based, at least in part, on the best-guess of the body part for each pixel.

16. The method of claim 15, further comprising assigning a confidence to each joint position based, at least in part, on individual confidences for each pixel.

17. The method of claim 5, further comprising assessing a confidence of the model-fitting pose based on a comparison of the model-fitting pose and the observed pose.

18. The method of claim 5, where selecting the exemplar pose or the model-fitting pose includes selecting the exemplar pose if a confidence in the exemplar pose is higher than or equal to a confidence in the model-fitting pose, and selecting the model-fitting pose if the confidence in the model-fitting pose is higher than the confidence in the exemplar pose.

19. The method of claim 5, where adjusting the rasterized pose of the model into the model-fitting pose includes applying one or more forces to force-receiving locations of the model and allowing the model to move responsive to such forces.

20. A computing system, comprising:
a source configured to capture depth information;
a logic subsystem operatively connected to the source; and
a data-holding subsystem holding instructions executable by the logic subsystem to:
receive an observed depth image of a target from a source;
analyze the observed depth image with a prior-trained collection of known poses to find an exemplar pose that represents an observed pose of the target;
rasterize a model of the target into a synthesized depth image having a rasterized pose;
adjust the rasterized pose of the model into a model-fitting pose based, at least in part, on differences between the observed depth image and the synthesized depth image; and
select the exemplar pose or the model-fitting pose.

* * * * *

UNITED STATES PATENT AND TRADEMARK OFFICE
CERTIFICATE OF CORRECTION

| | | |
|---|---|---|
| PATENT NO. | : 7,974,443 B2 | Page 1 of 1 |
| APPLICATION NO. | : 12/953069 | |
| DATED | : July 5, 2011 | |
| INVENTOR(S) | : Alex Kipman et al. | |

It is certified that error appears in the above-identified patent and that said Letters Patent is hereby corrected as shown below:

On the Title Page, in Item (73), under "Assignee" column 1, line 1, delete "Armonk, NY" and insert
-- Redmond, Washington --, therefor.

Signed and Sealed this
Twenty-third Day of August, 2011

David J. Kappos
*Director of the United States Patent and Trademark Office*